US009726765B2

(12) United States Patent
Arthur et al.

(10) Patent No.: US 9,726,765 B2
(45) Date of Patent: Aug. 8, 2017

(54) TIGHT OPTICAL INTEGRATION (TOI) OF IMAGES WITH GPS RANGE MEASUREMENTS

(75) Inventors: Thomas D. Arthur, Richfield, OH (US); Zhen Zhu, Greenville, NC (US); Sumit Bhattacharya, Encinitas, CA (US); Kim M. Scheff, College Park, MD (US); Maarten U. de Haag, Athens, OH (US); Kevin L. Johnson, The Plains, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 13/186,704

(22) Filed: Jul. 20, 2011

(65) Prior Publication Data

US 2012/0127030 A1 May 24, 2012

Related U.S. Application Data

(63) Continuation of application No. PCT/US2010/022262, filed on Jan. 27, 2010.

(60) Provisional application No. 61/147,664, filed on Jan. 27, 2009.

(51) Int. Cl.
*G01S 19/45* (2010.01)

(52) U.S. Cl.
CPC .................................. *G01S 19/45* (2013.01)

(58) Field of Classification Search
None
See application file for complete search history.

(56) References Cited

U.S. PATENT DOCUMENTS

| 5,432,520 A | 7/1995 | Schneider et al. |
| 5,815,411 A * | 9/1998 | Ellenby et al. ............... 702/150 |

(Continued)

FOREIGN PATENT DOCUMENTS

EP  1662440 A1 *  5/2006

OTHER PUBLICATIONS

Represent. (2007). In the American Heritage Dictionary of the English Language. Retrieved from http://www.credoreference.com/entry/hmdictenglang/represent.*

(Continued)

*Primary Examiner* — Bernarr Gregory
*Assistant Examiner* — Fred H Mull
(74) *Attorney, Agent, or Firm* — Wood Herron & Evans LLP

(57) ABSTRACT

A method of determining the position of a user in 3D space is disclosed. In one example, the method comprises utilizing range measurements from one or more GPS satellite vehicles, angular information of a camera located at the user position, and a camera image associated with one or more known markers. The method further comprises determining the angular information of the camera by determining a direction cosine matrix between a camera frame of reference and an earth frame of reference, and designating unit vectors that individually extend from a position within the camera image associated with one of the known markers through the camera focal point to the respective known marker The method also includes integrating into an ordinary least squares matrix, the GPS range measurements, the angular information of the camera, and the unit vectors, and calculating the user position by solving the ordinary least squares matrix.

22 Claims, 28 Drawing Sheets

(56) References Cited

U.S. PATENT DOCUMENTS

| | | | |
|---|---|---|---|
| 2003/0137658 A1* | 7/2003 | Ohtomo et al. | 356/141.4 |
| 2006/0149458 A1* | 7/2006 | Costello et al. | 701/200 |
| 2007/0016371 A1* | 1/2007 | Waid | G01C 21/06 701/470 |
| 2007/0052950 A1* | 3/2007 | Taylor et al. | 356/139.01 |
| 2008/0059068 A1* | 3/2008 | Strelow | G05D 1/0246 701/469 |
| 2008/0208455 A1 | 8/2008 | Hartman | |
| 2008/0270027 A1* | 10/2008 | Stecko | B64D 39/00 701/476 |
| 2008/0279421 A1* | 11/2008 | Hamza et al. | 382/103 |
| 2009/0254275 A1* | 10/2009 | Xie et al. | 701/213 |
| 2010/0176987 A1* | 7/2010 | Hoshizaki | 342/357.02 |
| 2010/0226448 A1* | 9/2010 | Dent | 375/260 |

OTHER PUBLICATIONS

D. Titterton et al., Strapdown Inertial Navigation Technology, 2nd Edition, Radar, Sonar, and Navigation Series 17, The Institution of Engineering and Technology, p. 21-25, 36, 39, and 311, 2004.*

E. Jacobson et al., SUO/SAS geolocation: land navigation using multiple integrated sensors, IEEE Military Communications Conference, vol. 1, p. 186-191, 2003.*

E.W. Weisstein, "Unit Vector." From MathWorld—A Wolfram Web Resource, http://mathworld.wolfram.com/UnitVector.html, 2015.*

Maybeck, P.S. Stochastic Models, Estimation, and Control: Introduction. Stochastic Models, Estimation, and Control, Academic Press, vol. 1, p. 1-16, 1979.*

International Preliminary Report on Patentability dated Aug. 11, 2011 for Application No. PCT/US2010/022262. 10 Pages.

International Search Report dated Apr. 23, 2010 for Application No. PCT/US2010/22262. 15 Pages.

Arthur, T. et al. "Demonstration of Tight Optical Integration (TOI) Algorithm Using Field Data." 8 Pages.

Bhattacharya, Sumit, et al. "An Algorithm for GPS Tight Optical Integration (TOI)." 6 Pages.

Bhattacharya, Sumit, et al. "An Evaluation of the Tight Optical Integration (TOI) Algorithm Sensitivity to Inertial and Camera Errors." 8 Pages.

Haag, Maarten, et al. "Performace Analysis and Integrity Aspects of Tight Optical Integration (TOI) with GPS." 8 Pages.

Soloview, Andrey. "Tight Coupling of GPS, Laser Scanner, and Inertial Measurements for Navigation in Urban Environments." 16 Pages.

* cited by examiner

TIGHT OPTICAL INTEGRATION (TOI) OF IMAGES WITH GPS RANGE MEASUREMENTS

RELATED APPLICATION

This application is a continuation application of International Application No. PCT/US2010/022262, filed Jan. 27, 2010, which claims priority to U.S. Provisional Application No. 61/147,664, filed Jan. 27, 2009.

STATEMENT OF GOVERNMENT INTEREST

This invention was made with Government assistance under NRL grant No. N00173-03-C-2037. The Government has certain rights in this invention.

FIELD OF INVENTION

The present invention relates generally to navigation and more particularly to a method for determining the position of a user in urban canyon and other such environments having limited or no GPS signal availability, the method using an innovative algorithm that integrates available single epoch GPS and optical sensor measurements to calculate the user position.

BRIEF DESCRIPTION OF THE DRAWINGS

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION OF THE INVENTION

Figure 1:
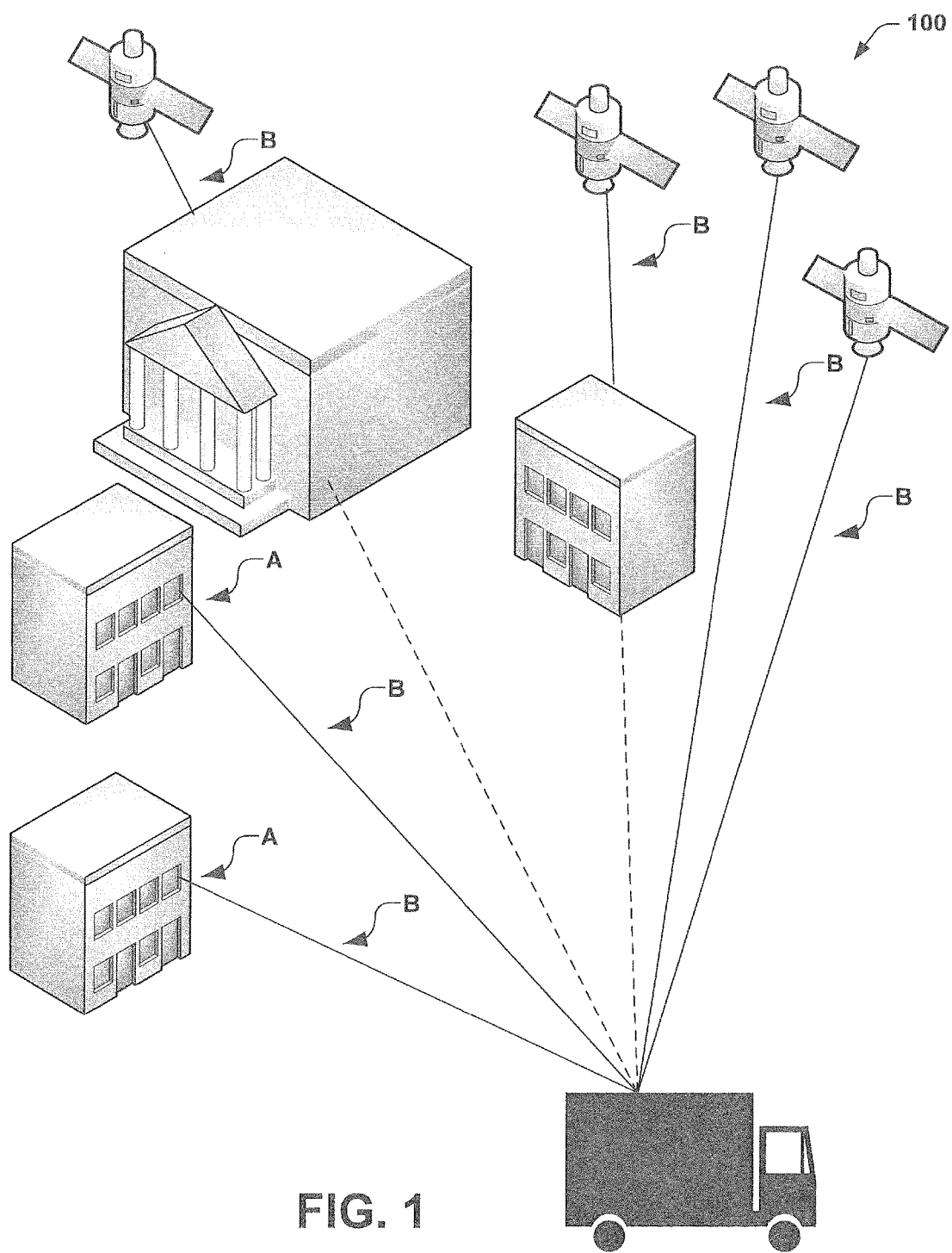
FIG. 1 is an example of a TOI conceptual diagram as may be used in accordance with one or more embodiments.

One or more aspects of the present invention are described with reference to the drawings, wherein like reference numerals are generally utilized to refer to like elements throughout, and wherein the various structures are not necessarily drawn to scale. It will be appreciated that where like acts, events, elements, layers, structures, etc. are reproduced; subsequent (redundant) discussions of the same may be omitted for the sake of brevity. In the following description, for purposes of explanation, numerous specific details are set forth in order to provide a thorough understanding of one or more aspects of the present invention. It may be evident, however, to one of ordinary skill in the art that one or more aspects of the present invention may be practiced with a lesser degree of these specific details. In other instances, known structures are shown in diagrammatic form in order to facilitate describing one or more aspects of the present invention.

The present invention comprises an algorithm referred to herein as the "Tight Optical Integration" (TOI) algorithm, which is designed to integrate optical information and single epoch GPS range measurements into the same domain. Optical measurements remain in the pixel domain, while GPS measurements remain in the range domain. This approach allows for reduced subsets of optical features and GPS measurements, which are separately not sufficient for a GPS-only or an Optical-only position solution. For instance, as few as one GPS satellite and/or 2 optical features or markers are capable of being utilized to form a position solution using the TOI algorithm.

In this paper the authors describe an algorithm called Tight Optical Integration (TOI). This algorithm integrates single epoch GPS range measurements and optical (camera) information to form position estimates. It is believed that this is the first algorithm in which GPS and optical measurements are integrated within an over-determined ordinary least squares geometry matrix.

Particular to this experiment GPS range and angle-based optical measurements are combined within the geometry matrix. Unlike LIDAR systems, no range information is required from the optical sensor. Due to satellite signal blockage and degradation within an urban environment it is likely that while some GPS signals are available, an insufficient number of measurements are available to calculate a GPS only position solution. Because of this it is shown that the availability of optical pseudolites can enhance system availability and accuracy within an urban canyon environment.

For greater than a decade performance gains have been realized through the integration of GPS and inertial sensors. Such integration has acquired a series of names such as 'loose,' 'tight,' 'deep,' and 'ultra-tight' to describe the level of integration. While at times increasing complexity, the deeper levels of GPS and inertial integration have substantially improved the tracking and performance range of GPS receivers. In addition to GPS, optical systems are currently being integrated with inertial sensors to create integrated navigation systems.

The earliest means of navigation has primarily been optical guidance. A more structured method is celestial navigation, whereby the relatively fixed stars have been used to aid the position estimate. With the development of inertial measurement equipment optical methods were used to stabilize and augment the inertial position estimate. Along with position, optical methods have been used successfully for stabilizing attitude estimates.

Currently, a significant amount of research is focusing on the fusion of optical and inertial measurements by using either multiple cameras (stereovision) or multiple epochs of the same camera (epipolar geometry). These methods have been shown to be very successful under denied or degraded GPS conditions. While it is acknowledged that the optical-inertial fusion is critical, our focus is on the optical-GPS fusion. It is not expected that the optical-GPS will replace optical-inertial fusion, but that it will be an additional tool in dealing with denied or degraded GPS environments.

The basic concept of TOI is the integration of angular measurement from the camera to a known optical marker with the range measurements from a GPS receiver. This enables calculation of a position solution even when insufficient GPS satellites are available for a GPS standalone position estimate. The TOI algorithm uses data from digital cameras and GPS instruments. The classical GPS least squares solution requires the formation of a geometry matrix that consists of unit vectors from the users to the visible satellites. This paper concentrates on a method that combines pixel and range measurements within this geometry matrix to form a position solution. Since the integration of the sensor outputs is at the measurement level the algorithm is considered a form of "tight" coupling between the optical system and GPS. It is important to understand that the TOI algorithm is a single-epoch single-camera approach that is different from a stereo (multi camera) or epipolar (multi-epoch) approaches.

FIG. 1 illustrates a sample scenario in which images could be used in addition to a partial GPS constellation. Points A indicate the locations of possible markers. Lines B are the line of sight vectors to the visible GPS satellites or markers.

Figure 2:
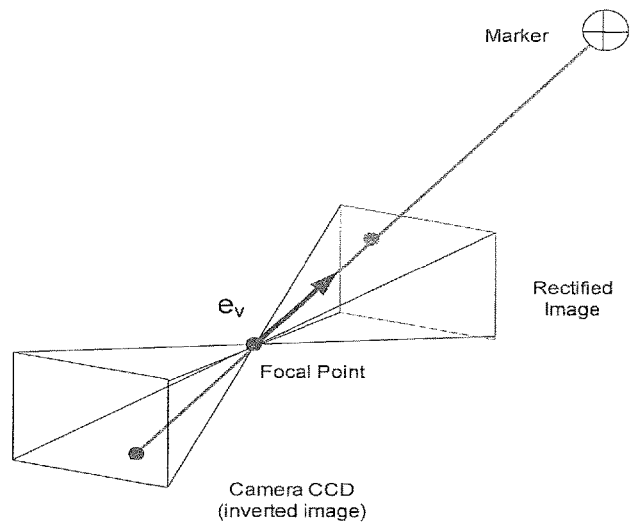
FIG. 2 is an example of a direction cosine in camera body frame as may be used in accordance with one or more embodiments.

Points A correspond to features extracted from the 2D image using methods such as Hough transform shape detectors, corner and edge detectors, stereo vision, the Scale Invariant Feature Transform (SIFT) or Speeded Up Robust Features (SURF). The geometry of forming the unit vector from the camera focal center to the marker, or any feature of the known location, is shown in FIG. 2. The actual inverted image exists on the charged cathode device (CCD) surface, while an artificially rectified image exists only in the data. A calibration of the camera maps the individual pixels into direction cosines, which are very similar to the geometry matrix used in GPS, with the exception of being in the body frame of reference.

To mathematically illustrate the problem, let's assume that the available measurements contain only three pseudoranges (PR) to three GPS satellites and an angular pixel measurement from the camera. Clearly the generic GPS equations can no longer be used to obtain a position solution when less than four satellites are available. However, the same principle of iteratively solving for position using a set of linearized differential equations can be applied to incorporate the additional camera measurement(s).

Pseudorange measurements to three satellites, their respective position vectors, and the user clock bias define the ranging equations required to solve for user position.

$$|x-x_n|-b=PR_n \qquad (1)$$

where:
x=the user position
$x_n$=the position vector of nth satellite
b=the user clock bias
$PR_n$=the pseudorange to nth satellite Linearizing the ranging equation, the change in pseudorange can be related to a change in position using the direction cosines to the satellites, as is shown in (2).

$$\Delta PR_n = e_{xn} \cdot \Delta x + e_{yn} \cdot \Delta y + e_{zn} \cdot \Delta z - b \qquad (2)$$

where:
$\Delta x, \Delta y, \Delta z$=Increments in the x, y, and z directions r respectively.
$e_{xn}$=x-component of unit vector to nth satellite
$e_{yn}$=y-component of unit vector to nth satellite
$e_{zn}$=z-component of unit vector to nth satellite However, for the number of satellites, n, equal to 3 at least one additional linear equation is required to solve for x and b. In the proposed TOI algorithm, this additional linear equation comes from the camera measurement.

Now, let $e_v$ be the unit vector pointing from the camera to the marker as derived from the camera measurements. Furthermore, let $x_v$ be the position of the marker. Note that in this paper the position of the marker is considered known since only one marker is included and only one camera frame is considered at a time. Extension of the proposed algorithm to multiple markers and multiple camera frames will remove this constraint from future implementations. Point $x_v$ and direction cosine $e_v$ define a line $I_v(x_v,e_v)$ on which the camera or the user should be located. To solve for user position x, an intuitive approach is to form an equation with $x_v$, x and $e_v$. However, since the GPS equations are formed based on iterative estimates of a change in position, a camera equation based on $\Delta x$ must be developed. Denote the current estimate of x by $\hat{x}$. If $\hat{x}$ is not on the line $I_v(x_v,e_v)$, the correcting term $\Delta x$ has to lead the net estimation back onto the line.

Figure 3:
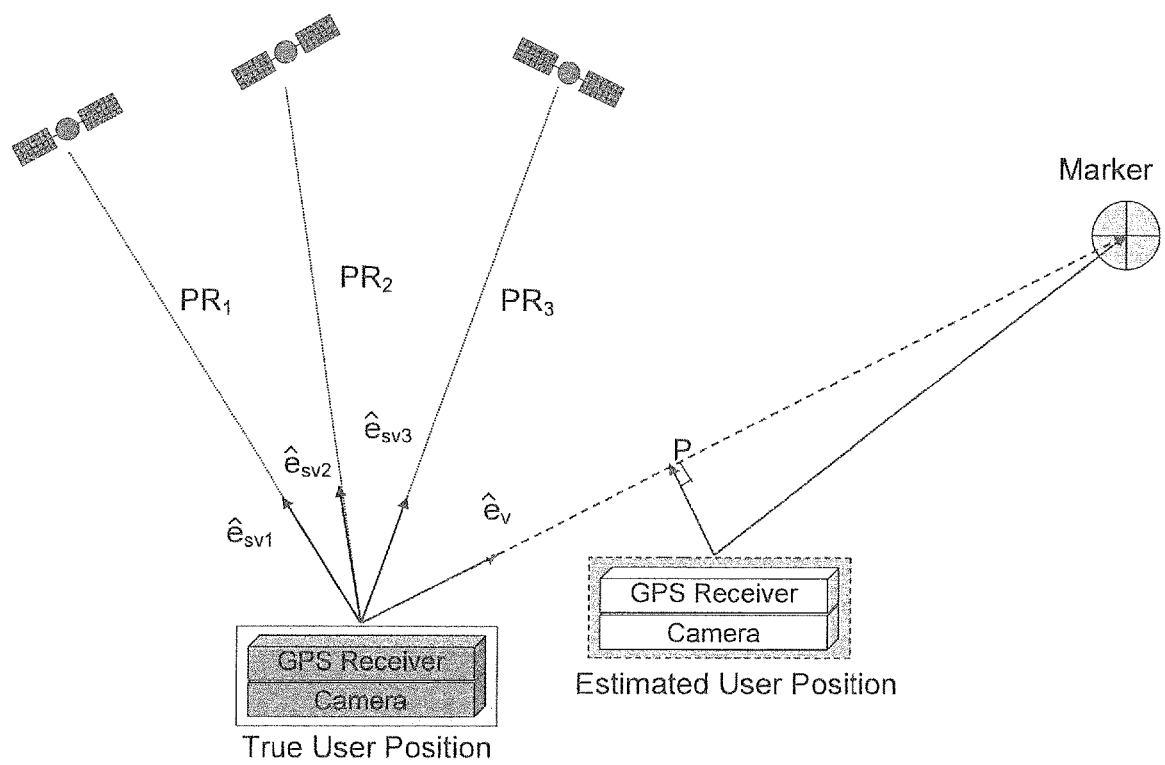
FIG. 3 is a diagram of TOI showing iteration stage as may be used in accordance with one or more embodiments.

Define $v=[v_1\ v_2\ v_3]^T$ as the shortest vector starting from the estimated camera location $\hat{x}$ and ending at the line $I_v(x_v,e_v)$. As can be seen in FIG. 3, point P is where v joins vector $e_v$. v has the minimum length when it is perpendicular to unit vector $e_v$ and can be expressed as follows:

$$v=[I+e_v e_v^T](x_v-\hat{x}) \qquad (3)$$

Note that all terms in equation (3) are known in our current implementation given a particular position estimate. Choosing $$\Delta x=v \qquad (4)$$

a 'line' constraint is introduced in the set of linear equations that must be solved causing the solution to be forced to the line-of-sight to the marker at each iteration epoch. Equation (4), together with equation (2) form the navigation equation set with three GPS satellites and one camera measurement. Put all the equations into matrix format, we define the following GPS-visual T matrix:

$$T = \begin{bmatrix} e_{sv} & -1 \\ kI & 0 \end{bmatrix} \qquad (5)$$

where:

$$e_{sv} = \begin{bmatrix} e_{x1} & e_{y1} & e_{z1} \\ e_{x2} & e_{y2} & e_{z2} \\ e_{x3} & e_{y3} & e_{z3} \end{bmatrix}$$

and
I=3-by-3 identity matrix
k=camera weighting factor

The GPS-visual x vector is still the same as the GPS only x vector $$x'=[\Delta x\ \Delta y\ \Delta z\ b]^T \qquad (6)$$

And the GPS-visual measurement vector y becomes $$y'=[\Delta PR_1\ \Delta PR_2\ \Delta PR_3\ v_1\ v_2\ v_3]^T \qquad (7)$$

Thus, the measurement equation becomes:

$$y'=Tx' \qquad (8)$$

The Ordinary Least Squares estimate for x' is then given by:

$$x'=(T^TT)^{-1}T^Ty' \qquad (9)$$

In essence, the addition of the camera measurement constraints the user estimate to the line defined by $I_v(x_v,e_v)$ and thus reduces the number of degrees of freedom to two. Hence, at least two GPS equations are required to solve the problem. One camera measurement plus one GPS equation does not suffice.

Evidently, the camera measurements drive the estimated user position to the $I_v(x_v,e_v)$ line, while the available GPS pseudorange measurements drive the estimate to the true user position along the line-of-sight to the camera. Clearly, both of these effects are driven by sensor errors and the algorithm's sensitivity to the respective sensors. It should also be noted that, in the present implementation and experiment, we have considered three GPS measurements and one camera measurement. Hence it is necessary to weigh the camera measurement against the GPS measurements appropriately. The parameter k was selected to de-weight the camera equations in the estimator. The 'k' parameter typically ranges from 0 to 1. A large k attributes a higher weight to the camera equations and, consequently, helps to quickly drive the solution to the marker line-of-sight. However, it is not always beneficial to have a large k. If during the iterations of solving equation (9), the estimation $\hat{x}$ is already on the vector $I_v(x_v,e_v)$, k should be 0 as the camera corrections are no longer required. A large k would prevent the GPS corrections from being fully effective. Small k values help the algorithm to converge faster locally, but these values could cause computation stability issues, as the matrix T may become singular or near singular.

The method used to demonstrate the algorithm in this paper uses a combination of real GPS constellation data along with simulated pseudorange data combined with synthesized camera measurements. The data processing steps and algorithm are implemented using Matlab®. For the purpose of illustrating the algorithm in this paper, the camera data is synthesized by replacing a GPS satellite with a marker with an equivalent direction cosine as would be available from a camera. The pseudorange measurement to this satellite is discarded. For instance, if a GPS satellite were blocked by a building, it is assumed that an optical marker (any known feature) is available at the same angular position. Note that this is a simplification necessary to test the performance and convergence properties of the proposed method. This is sufficient because range measurement from the optical sensor is not required for this algorithm. In essence, a marker for the optical sensor is simulated in the same direction as that of the blocked GPS satellite. This method allows direct comparison between TOI and GPS performance under identical geometric conditions.

The focus of this paper is to make a preliminary assessment of this TOI algorithm. As a result, some assumptions were made to simplify the implementation as an initial step. While, it is recognized that body attitude information is required to rotate the camera from the body to navigation frame of reference, the simulations will assume perfect gyroscope sensor information. By this assumption, the surveyed location along with a priori knowledge of the marker location is used to rotate the optical vector into the earth frame. This allows separation of TOI process errors from the gyroscope instrument errors. The TOI position estimation occurs as part of an iterative process.

Additionally, it is recognized that the feature extraction and association problem is difficult and must be solved in future implementations of the proposed algorithm. This paper has assumed that this problem has been solved and ignores the problems associated with video feature identification.

Also, for the purpose of this scenario the same reference point for the GPS and camera measurements is used. This follows directly from simulating camera angular measurements from GPS satellite direction cosines.

Figure 4:
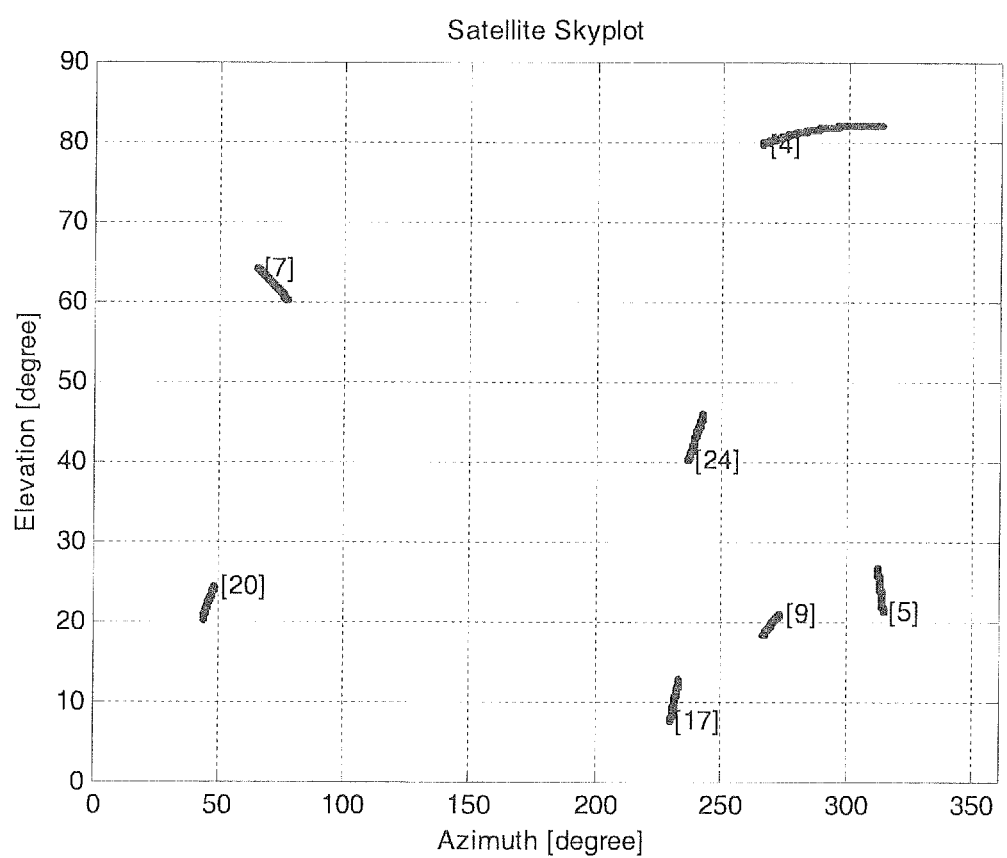
FIG. 4 is a skyplot of dataset as may be used in accordance with one or more embodiments.

Results of the simulation using sets of 4 GPS satellite vehicles (SV) from the sky plot depicted in FIG. 4 are shown in this section. The GPS performance results are all generated using all subsets of 4 SVs. The GPS solution uses all possible sets of 4 SVs to form a position estimate. The TOI solution, then, replaces one SV in each sub-set with a synthesized optical measurement.

All pseudorange measurements were simulated using zero-mean independent Gaussian range measurements with a standard deviation of 5 meters. The simulated range to the marker was 500 meters.

Figure 5:
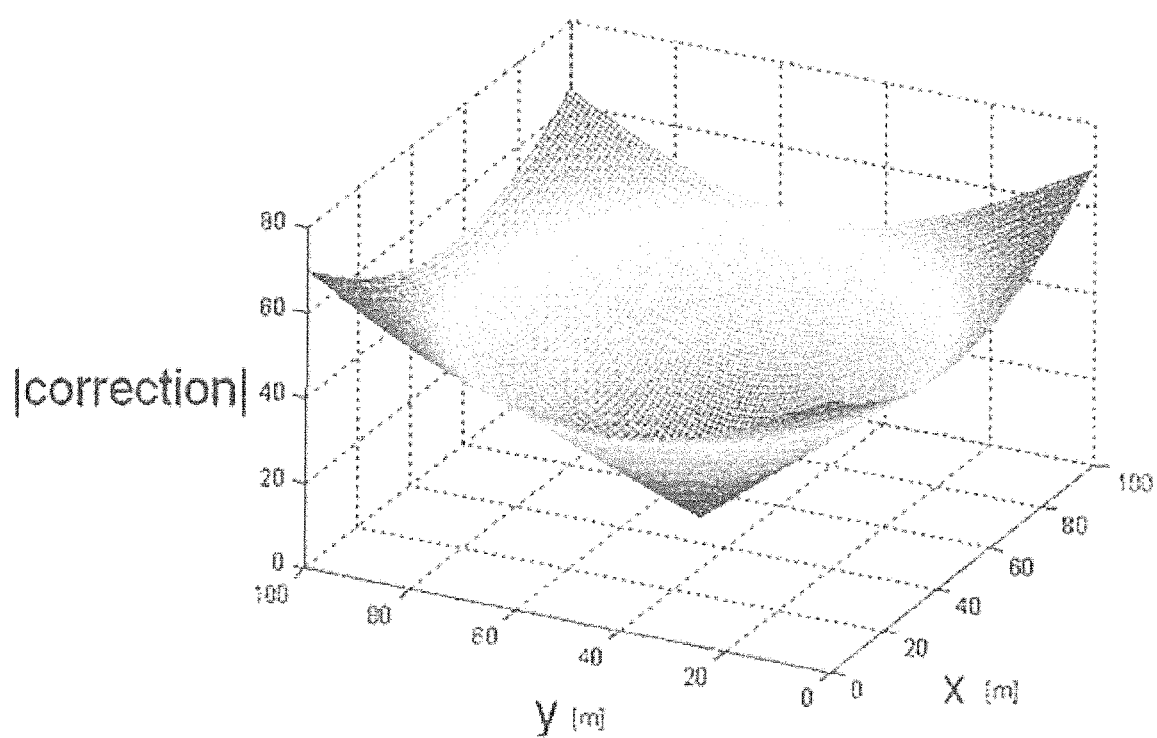
FIG. 5 is an example of a convergence surface for TOI with [x,y]=[50,50] as may be used in accordance with one or more embodiments.

An example of a convergence surface for a single epoch of the TOI simulation is shown in FIG. 5. While the actual convergence process follows only one path along this surface, the surface is shown to help the reader conceptualize the TOI convergence process. The z-axis of the plot shows the magnitude of the computed correction for a specific x-y position error. Most important to note is the fact that there are no local minimum or maxima which would cause the TOI algorithm to select the wrong convergence point.

Figure 6:
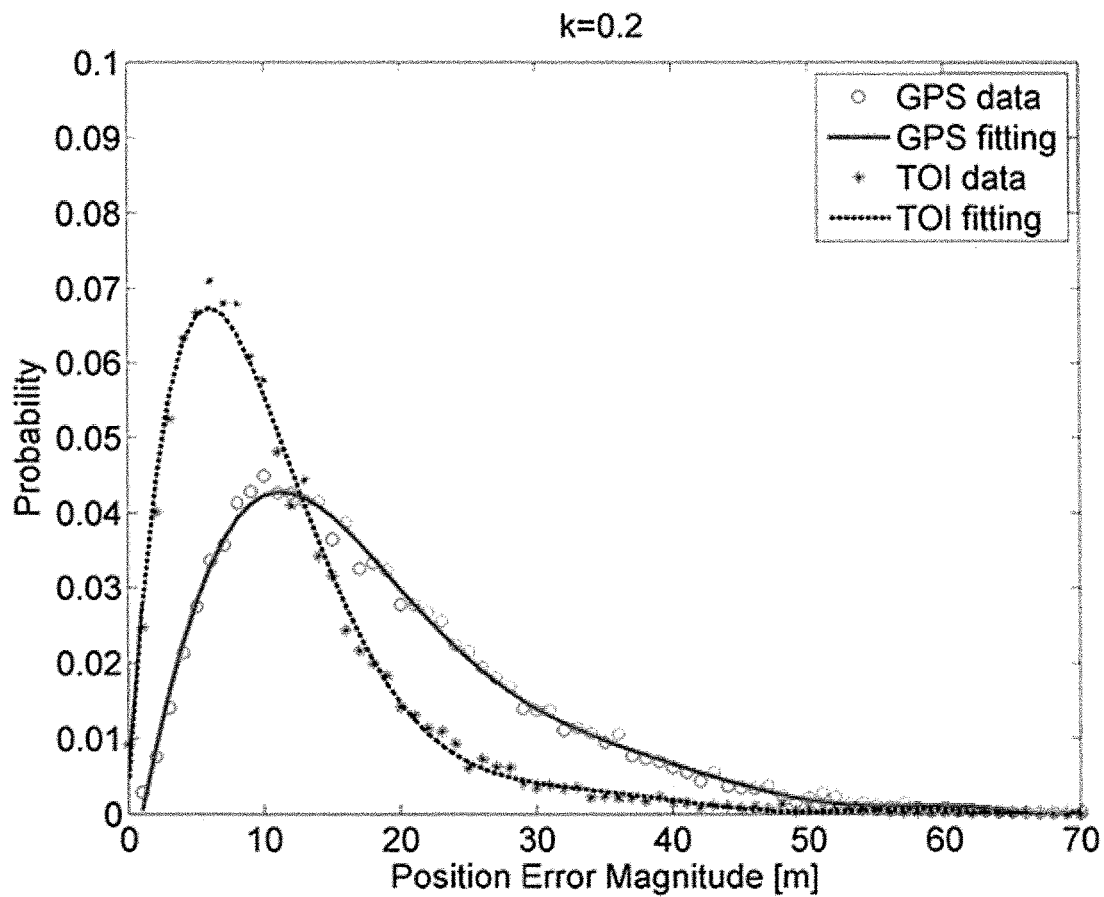
FIG. 6 is an example of position error PDF with k=0.2 as may be used in accordance with one or more embodiments.

The algorithm was evaluated with a weighting factor k; k=0.2 respectively. Probability Distribution Functions (PDF) of the 3D error magnitudes for GPS only and TOI are shown in FIG. 6.

A summary of the above scenario is shown in Table 1. Where the magnitude error magnitude was taken with respect to a surveyed GPS antenna location.

It can be clearly observed that the TOI enables position estimation in an urban environment with less than three visible satellites. Furthermore, the performance of the TOI implementation is slightly better for the scenarios shown. Note that more geometry scenarios must be evaluated in future research.

TABLE 1

Position Error Magnitude Results

| Description | Value (m) |
| --- | --- |
| Weighting Factor (k) | 0.20 |
| GPS Position Error Magnitude, Mean | 18.94 |
| GPS Position Error Magnitude, Std. Dev. | 11.40 |
| TOI Position Error Magnitude, Mean | 11.86 |
| TOI Position Error Magnitude, Std. Dev. | 8.87 |

It is thus illustrated that it is feasible to tightly integrate GPS range measurements and optical angular measurements on an epoch-by-epoch basis. The results from a static simulation of the TOI algorithm using 5 m (1 sigma) pseudorange errors, a marker distance of 500 meters, and no inertial measurement error, show equivalent or better performance of the TOI as compared to stand-alone GPS. For a camera weighting factor of k equal 0.2, the mean position error magnitude showed more than 40% of improvement. Additionally the standard deviation showed a slight improvement.

As is expected, since there were no inertial errors simulated, the greater camera weighting factor produced improved results. However, the optimal weighting with inertial errors may vary.

It is expected that TOI sensitivities to inertial and camera errors will be relatively small at the close practical ranges considered in the current TOI operational scenarios. For instance, a one degree camera or inertial error with a range to marker of 50 meters is predicted to cause a sub-meter position estimate error with a single marker.

This paper evaluates the performance of the tight integration of GPS and optical sensors such as digital vision cameras. The paper furthermore addresses certain integrity aspects of the proposed Tight Optical Integration (TOI) method. Target applications for the proposed system include the operation of UAVs in an urban environment for both civil and military applications. A regular unaided GPS position solution requires at least four satellites. However, in an urban canyon it is likely to have fewer than four GPS satellites at certain locations due to satellite signal blockage and degradation. Augmentation of GPS with measurements from other sensors is thus required for a reliable navigation capability in an urban environment. TOI integrates range measurements from the available GPS satellites (usually less than four) with feature data from a regular camera to form position estimates. If a building blocks a GPS satellite, markers or features on that building can be located and used as an "optical pseudolite." Unlike pseudolite or laser range scanner measurements, no range information is required from the optical sensor. Instead, the TOI algorithm takes the estimated azimuth and elevation of the marker to form an equivalent direction cosine for this marker. Then, these direction cosines are combined with range measurements from GPS satellites in a weighted least square solution. The current implementation of the TOI method forms linearized camera equations together with the linearized GPS equations and solves for the solution iteratively similarly to a regular GPS only solution. Inertial sensors are used to transform direction cosines from the camera frame to the GPS frame.

To enable operation of aerial vehicles at any time in any environment a Precision Navigation, Attitude, and Time (PNAT) capability is required that is robust and not solely dependent on the Global Positioning System (GPS). In urban environments, for example, the number of available GPS satellites may be limited due to shadowing, significant signal attenuation and multipath caused by buildings, or due to intentional denial or deception. Although integration of GPS and Inertial Measurement Unit (IMU) data may prove to be a viable solution, an alternative method is the topic of discussion in this disclosure.

Figure 7:
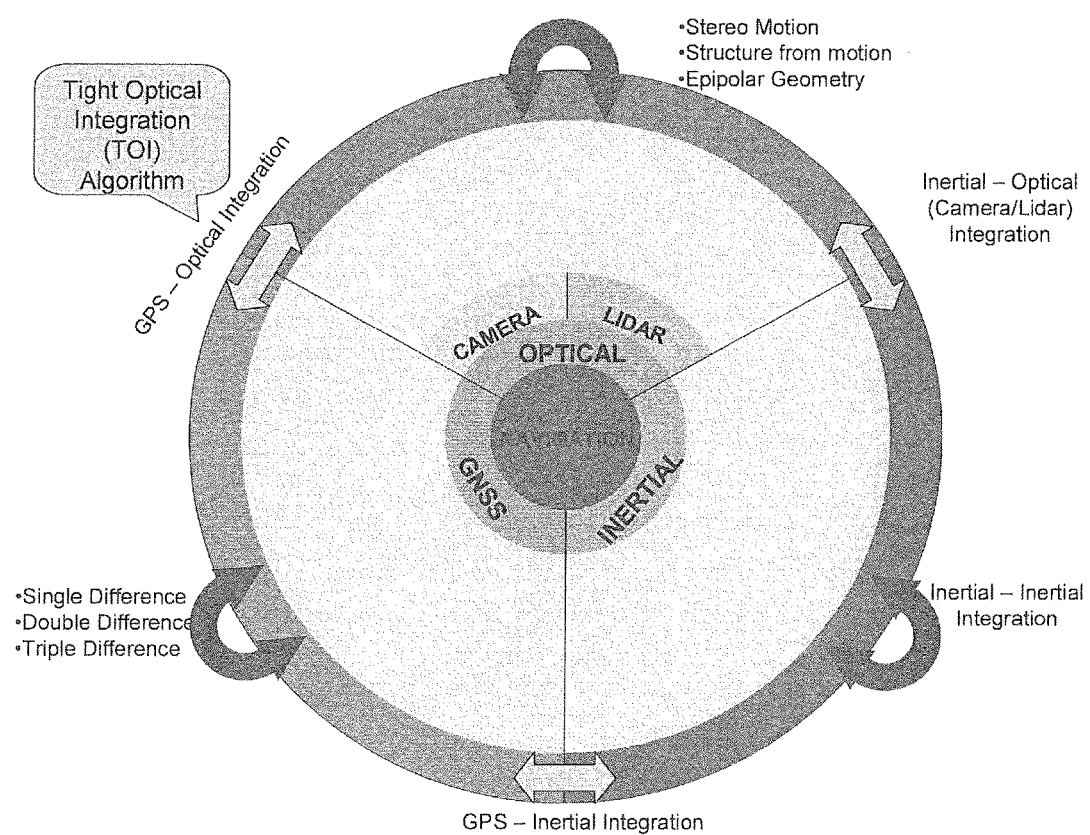
FIG. 7 shows sensor integration strategies as may be used in accordance with one or more embodiments.

Various sensor integration strategies have been and are still being considered to enable navigation in a GPS-challenged environment. FIG. 7 shows a depiction of some of these strategies. Integration of GPS with Inertial sensors has been studied extensively. For example, describes a deep integration method for assessment of GPS quality in urban environments. Currently, a significant amount of research focuses on the fusion of optical and inertial measurements by using either multiple cameras (stereo-vision) or multiple epochs of the same camera (epipolar geometry, tri-focal tensors). These methods derive user motion estimates from the observed change in structure in the camera Field-of-View (FoV) using multiple points common between two or more views of the environment. Another approach is the use of 2D laser radar (LADAR) data to estimate the position and pose changes in urban and indoor environment. For increased robustness the LADAR data can be integrated with inertial data to enable 2D navigation or even 3D navigation in urban environments. Finally, 3D vision cameras can be integrated with inertial measurements or multiple 2D LADAR systems can be integrated with inertial measurements to estimate the user position in 3D space.

TOI integrates camera imagery and GPS range measurements. The imagery data is used to find one or more 'a priori' known features (so-called 'markers'), which are then used to estimate the position of the user. The method allows the user to operate in environments where less than four satellites are available. It is important to note that 'a priori' knowledge of the markers location is necessary for this method to work. Two sources for these marker locations are previous mapping missions over the urban environment (like LIDAR mapping efforts) or self-surveying of the markers while sufficient GPS satellites are available.

Test results of the TOI architecture originally proposed in have been presented in. In that paper it is shown that known optical markers can be used in places where less then the required four satellites are available and accuracies of the same magnitude of standalone GPS have been demonstrated. Although TOI does not tightly integrate IMU measurements in its solution, IMU attitude measurements are required to perform the transformation from camera-to-navigation frame.

Before we derive the integration methodology for vision and GPS measurements, we once more state the standard GPS linearized measurement equations as found in various textbooks such as. The standard satellite user geometry assumes a minimum of four satellites to estimate the user position and is shown in FIG. 8. xsv,i and esv,i represent the position of satellite 'i' and the direction cosine (unit vector) to satellite 'i', respectively.

Figure 8:
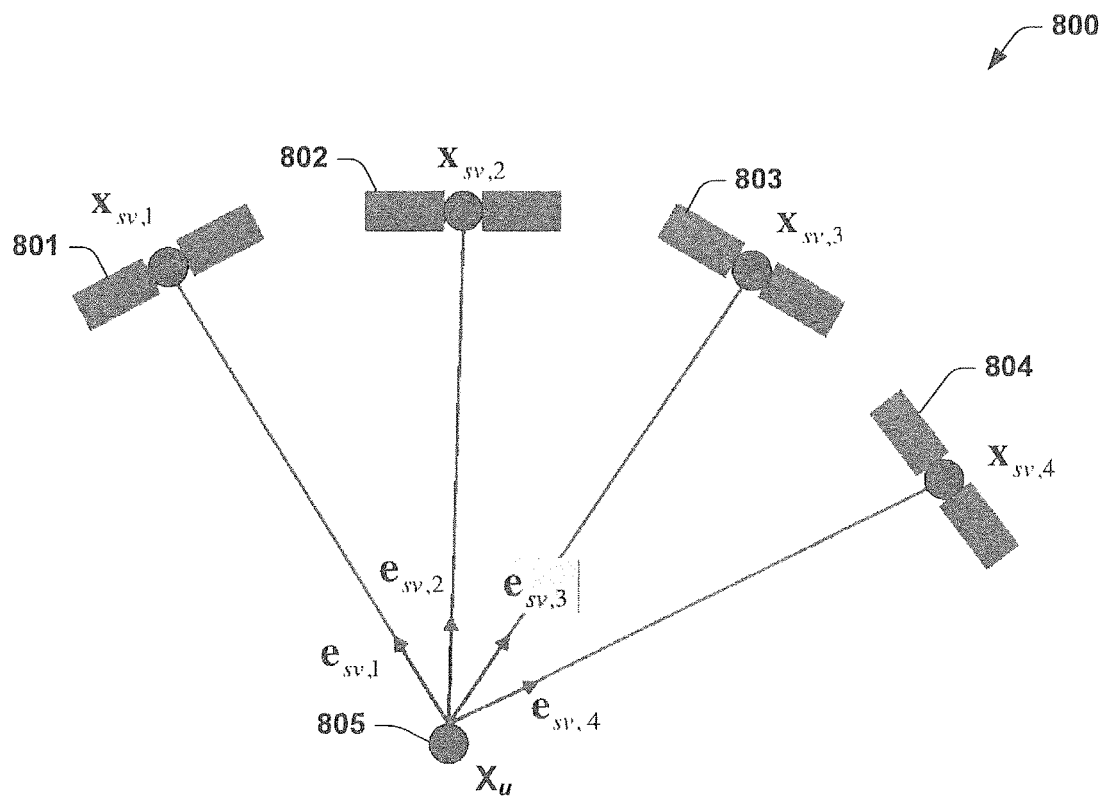
FIG. 8 is a simplified diagram of a conventional GPS geometry having four GPS satellite vehicles such as may be used in accordance with one or more embodiments.

Given the configuration in FIG. 8, the standalone GPS measurement equation is given by:

$$y = \Delta PR = \begin{bmatrix} e_{sv,1}^T & 1 \\ M & M \\ e_{sv,N}^T & 1 \end{bmatrix} \begin{bmatrix} \Delta x \\ \Delta y \\ \Delta z \\ \Delta b \end{bmatrix} = H \Delta x \quad (10)$$

Equation (10) relates a change in position to a change in pseudorange and must therefore be iterated at each time epoch to obtain the snapshot position estimate, or:

$$\Delta \hat{x} = (H^T H)^{-1} H^T \Delta PR$$

$$\hat{x}_k = \hat{x}_{k-1} + \Delta \hat{x}_{k-1} \quad (11)$$

The advantage of TOI, as will be shown in the remainder of this section, is that the inclusion of one or more optical markers just results in a extension of the measurement matrix H in equation (11).

Figure 9:
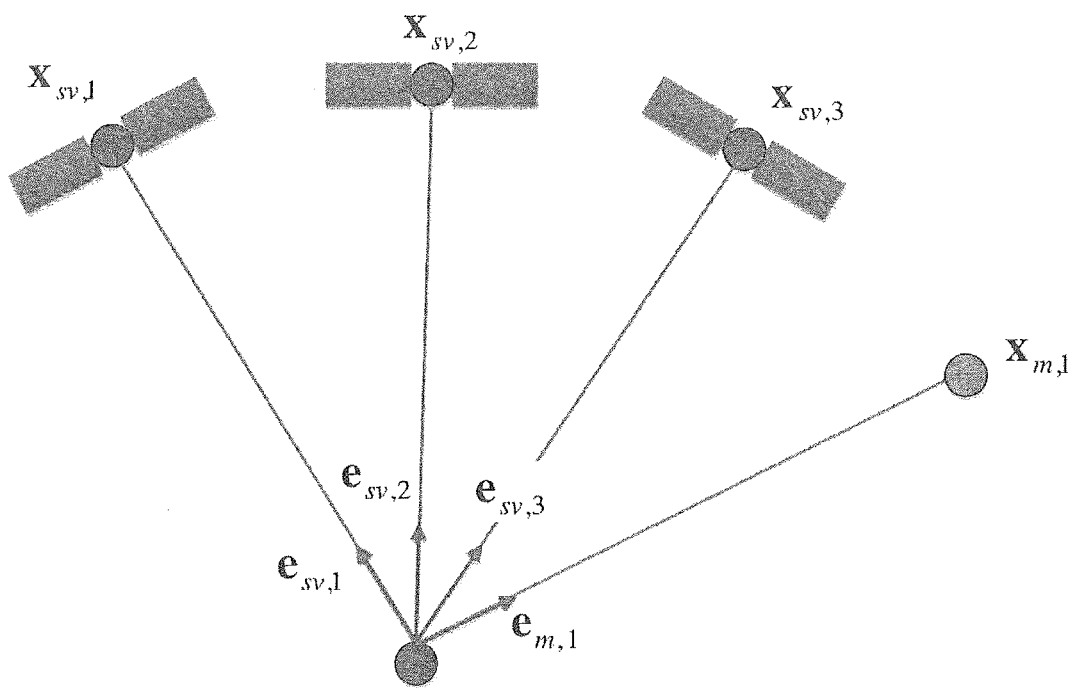
FIG. 9 is a diagram of geometry with three GPS satellite vehicles and one marker present as may be used in accordance with one or more embodiments.
Figure 10:
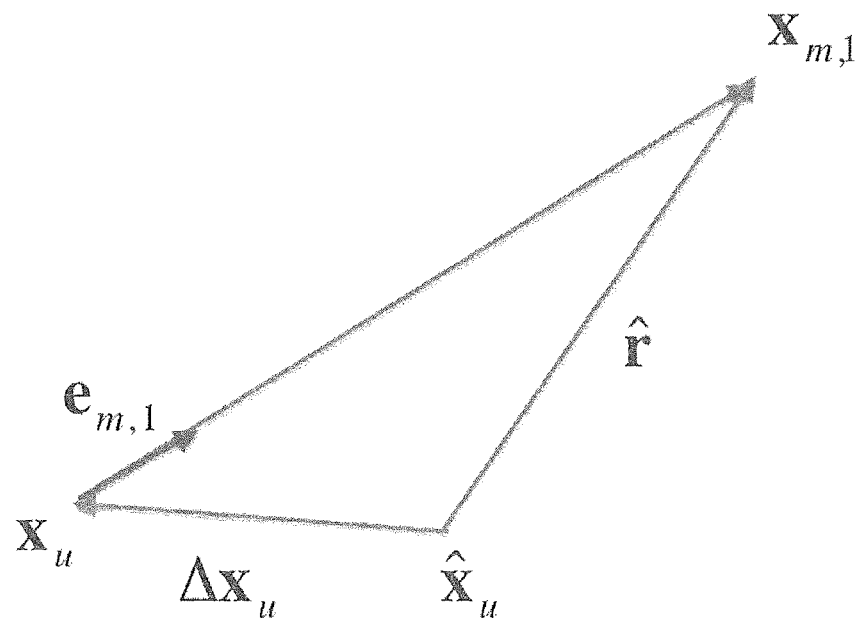
FIG. 10 shows marker geometry in the presence of a position offset as may be used in accordance with one or more embodiments.

Now, let us focus on the marker geometry of FIG. 9. In the presence of a position-offset Δxu from the true position xu, the marker geometry as depicted in FIG. 10 can be considered. Note that in FIG. 10, both the marker position xm,1 and the unit vector em,1 pointing to the marker (derived from the camera imagery) are known.

Figure 11:
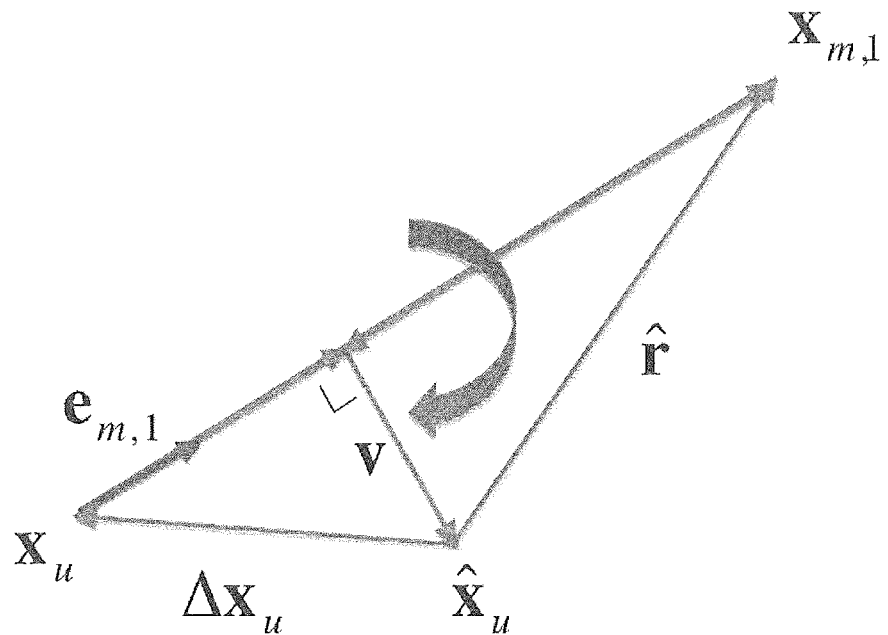
FIG. 11 shows marker geometry with dummy vector v as may be used in accordance with one or more embodiments.

A dummy vector v is added to the geometry of FIG. 10. This vector starts at the line connecting the true position to the marker location, ends at the position estimate, and is perpendicular to the line-of-sight. This vector is depicted in FIG. 11.

Now, an expression for v can be derived as follows:

$$v = \hat{r} - e_{m,1}(e_{m,1} \cdot \hat{r}) \quad (12)$$
$$= \hat{r} - e_{m,1} e_{m,1}^T \hat{r}$$
$$= (I - e_{m,1} e_{m,1}^T) \hat{r}$$
$$= (I - e_{m,1} e_{m,1}^T)(x_{m,1} - \hat{x}_u)$$

Equation (12) depends solely on quantities that are known: the line-of-sight unit vector, the marker position and the position estimate. Equation (12) can be used to compute the 'derived' measurement v that will be used as an input to our method.

However, similar to the derivation in (12), an expression can be found that relates the 'derived' measurement v to the offset between the estimate and true vector, or $$v = \Delta x_u - e_{m,1}(e_{m,1} \cdot \Delta x_u) \quad (13)$$
$$= \Delta x_u - e_{m,1} e_{m,1}^T \Delta x_u$$
$$= (I - e_{m,1} e_{m,1}^T) \Delta x_u$$
$$= H_v \Delta x_u$$

Hv is the geometry matrix for the marker and depend solely on the line-of-sight unit vector to that marker.

$$H_v = I - e_m e_m^T = \begin{vmatrix} 1 - e_{x,m}^2 & e_{x,m} e_{y,m} & e_{x,m} e_{z,m} \\ e_{x,m} e_{y,m} & 1 - e_{y,m}^2 & e_{y,m} e_{z,m} \\ e_{x,m} e_{z,m} & e_{y,m} e_{z,m} & 1 - e_{z,m}^2 \end{vmatrix} \quad (14)$$

Now, the measurement equation in (13) can be combined with the measurement equation for standalone GPS:

$$y = \begin{bmatrix} \Delta PR_1 \\ \Delta PR_2 \\ \Delta PR_3 \\ v_x \\ v_y \\ v_z \end{bmatrix} = \begin{bmatrix} e_{sv,1}^T & 1 \\ e_{sv,2}^T & 1 \\ e_{sv,3}^T & 1 \\ H_v & 0 \end{bmatrix} \begin{bmatrix} \Delta x \\ \Delta y \\ \Delta z \\ b \end{bmatrix} \quad (15)$$

The estimate of the position change and GPS clock bias can be found using a standard least squares estimator similar to equation (11).

In and, a simplified version of equation (15) was utilized that replaced Hv with a scaled identity matrix or, $$y = \begin{bmatrix} e_{sv,1}^T & 1 \\ e_{sv,2}^T & 1 \\ e_{sv,3}^T & 1 \\ kI & 0 \end{bmatrix} \begin{bmatrix} \Delta x \\ \Delta y \\ \Delta z \\ b \end{bmatrix} \quad (16)$$

Although this simplification does no longer accurately represent the marker geometry, the least squares solution will still converge given a correctly chosen value for 'k', the convergence speed factor. The reason that the solution still converges can be observed from FIG. 11. Instead of forcing the solution from the wrong estimate to an estimate closer to the true value, the simplified method of equation (16) forces the solution to the line-of-sight. Then, the GPS measurements force the solution along the line-of-sight to the true value.

Figure 12:
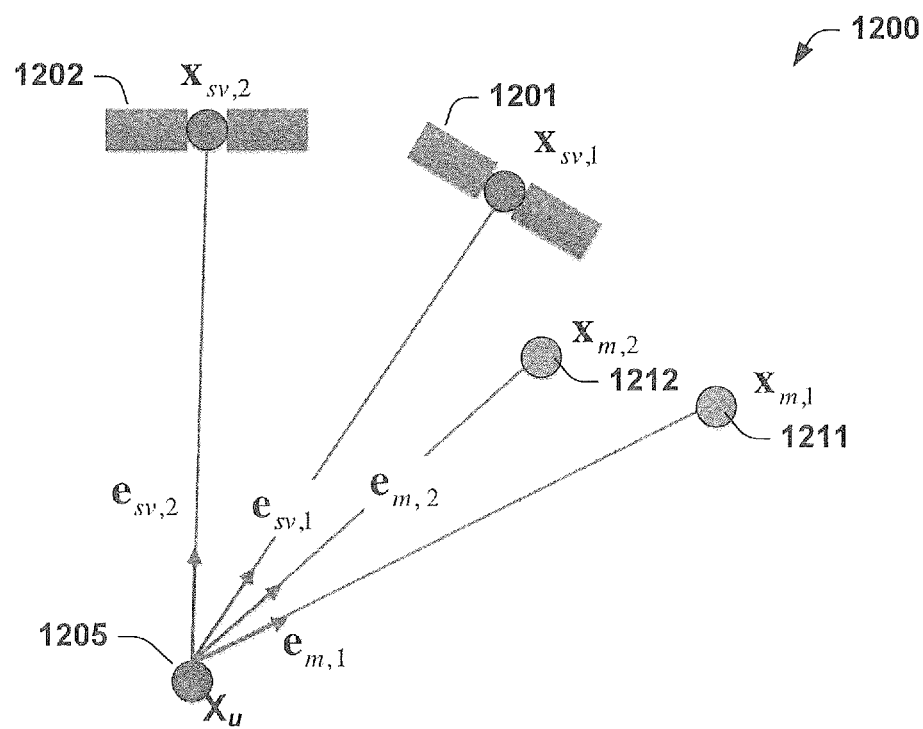
FIG. 12 is a simplified diagram of an exemplary TOI geometry comprising two GPS satellite vehicles and two markers, such as may be used in accordance with one or more embodiments.

More than one marker can be used to estimate the user position. Knowledge of two or more markers would no longer require the integration of GPS range measurements. However, GPS range measurements could still be included to estimate the GPS clock bias, to be able to detect systematic (bias) errors in GPS range measurements or marker positions, or to improve the robustness of the overall solution. The two-marker geometry is shown in FIG. 12.

Inclusion of the second marker in the integration method is a straightforward extension of equation (15):

$$y = \begin{bmatrix} \Delta PR_1 \\ \Delta PR_2 \\ \Delta PR_3 \\ v_{1,x} \\ v_{1,y} \\ v_{1,z} \\ v_{2,x} \\ v_{2,y} \\ v_{2,z} \end{bmatrix} = \begin{bmatrix} e_{sv,1}^T & 1 \\ e_{sv,2}^T & 1 \\ e_{sv,3}^T & 1 \\ H_{v,1} & 0 \\ H_{v,2} & 0 \end{bmatrix} \begin{bmatrix} \Delta x \\ \Delta y \\ \Delta z \\ b \end{bmatrix} \quad (17)$$

The implementation of equations (15), (16) and (17) will be evaluated using simulation results in the next section.

Figure 13:
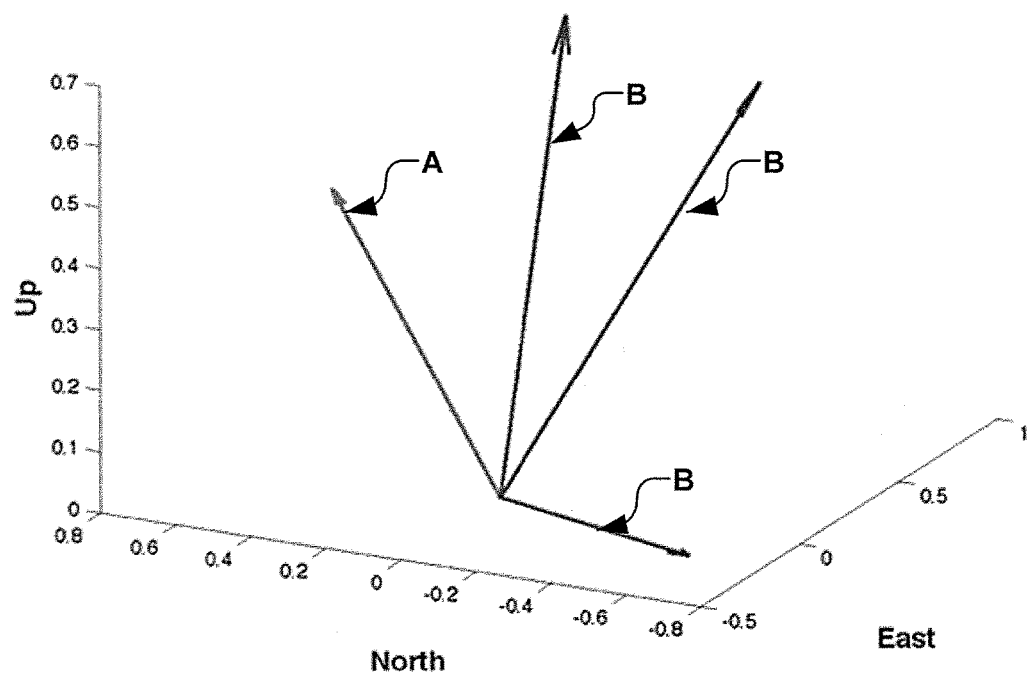
FIG. 13 is a simplified diagram of line-of-sight vectors to marker A and satellites B as may be used in accordance with one or more embodiments.

The first scenario that was implemented to evaluate the performance of the TOI methods compares a four-satellite position solution with the full-matrix TOI implementation of equation (15) and the k-matrix TOI implementation of equation (16). The GPS User equivalent Range Error (UERE) was set to 15 m, 1σ. This value is higher than the nominal value, but was deemed representative for the decreased performance in an urban environment. It is important to note that the simulation did NOT include the modeling of multipath error even though these have been shown to be substantial. The value for 'k' was chosen to be k=0.2, similar to the value used in the urban test implementation of. In the first 500 case Monte-Carlo, the marker uncertainty was set equal to 0 m. FIG. 13 shows the geometry and FIG. 14 shows the results of Monte-Carlo for all three cases.

Figure 14:
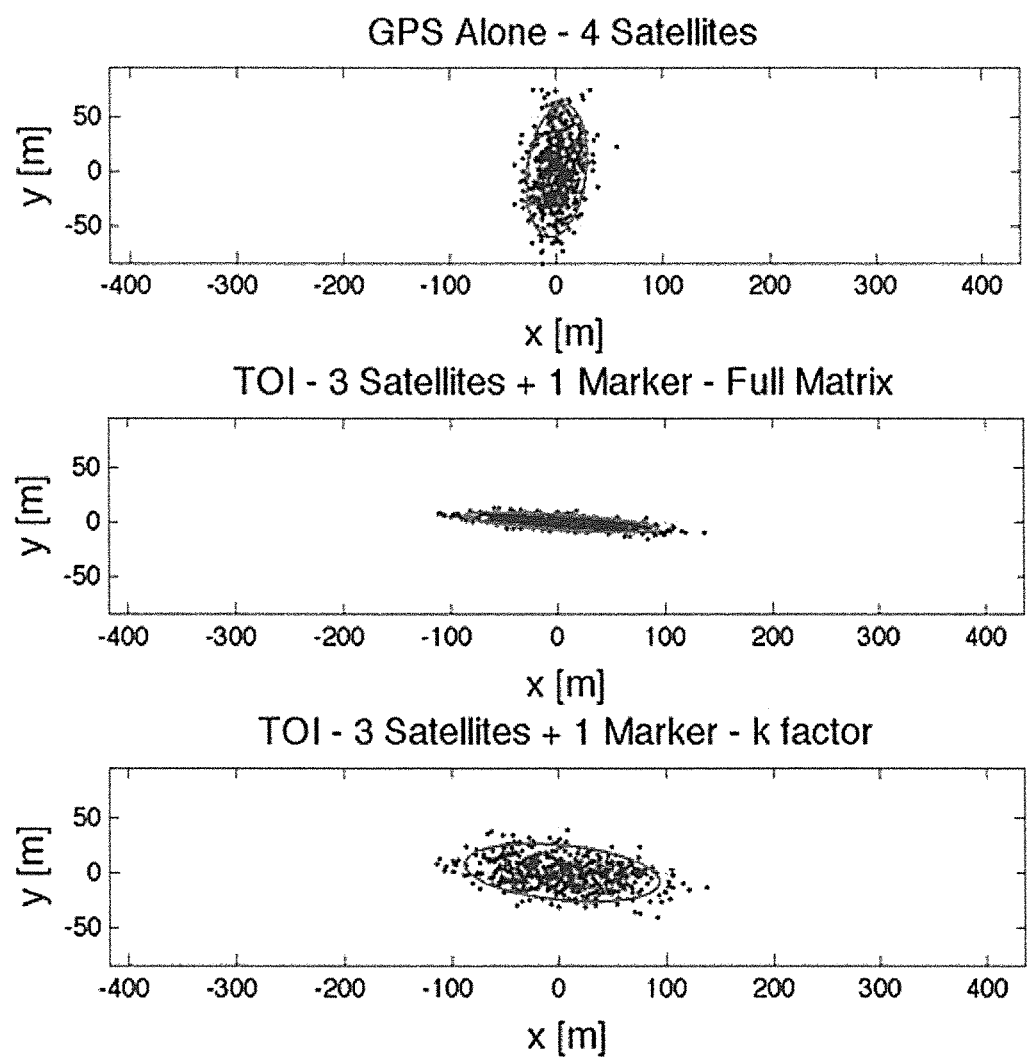
FIG. 14 is a graph showing Monte-Carlo results for TOI with no marker uncertainty as may be used in accordance with one or more embodiments.

The difference between the performance of the full-matrix implementation of TOI and the k-matrix implementation can be observed in FIG. 14. Since the full-matrix implementation does accurately represent the marker geometry, the covariance ellipse (shown in red in the image) follows the line-of-sight (LOS) vector to the marker having only small uncertainty in the cross-LOS direction and a larger uncertainty in the along-LOS direction. The uncertainty in the along-LOS direction can be fully attributed to the GPS errors. With the k-matrix implementation the errors in the cross-LOS direction are significantly larger than the full-matrix implementation but similar to GPS.

Figure 15:
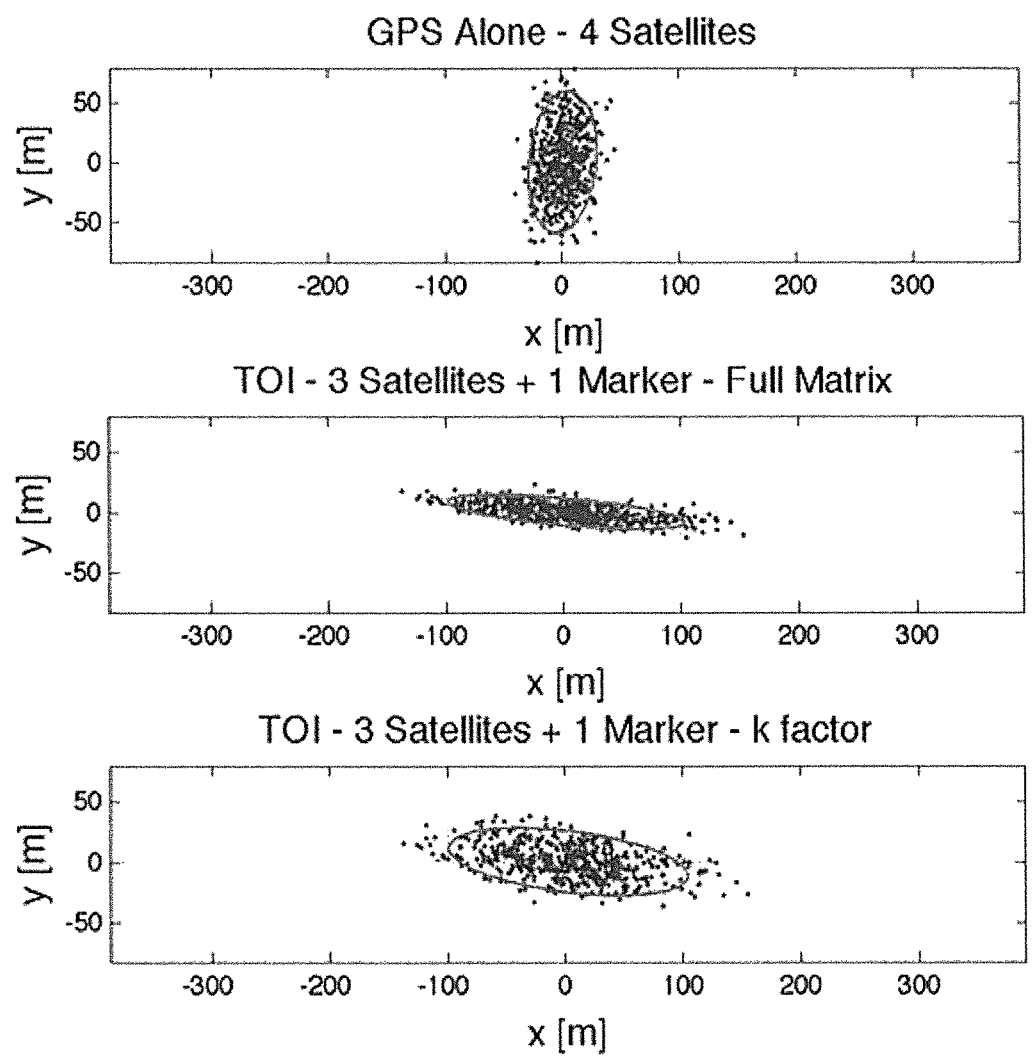
FIG. 15 is a graph showing Monte-Carlo results for TOI with marker uncertainty as may be used in accordance with one or more embodiments.
Figure 16:
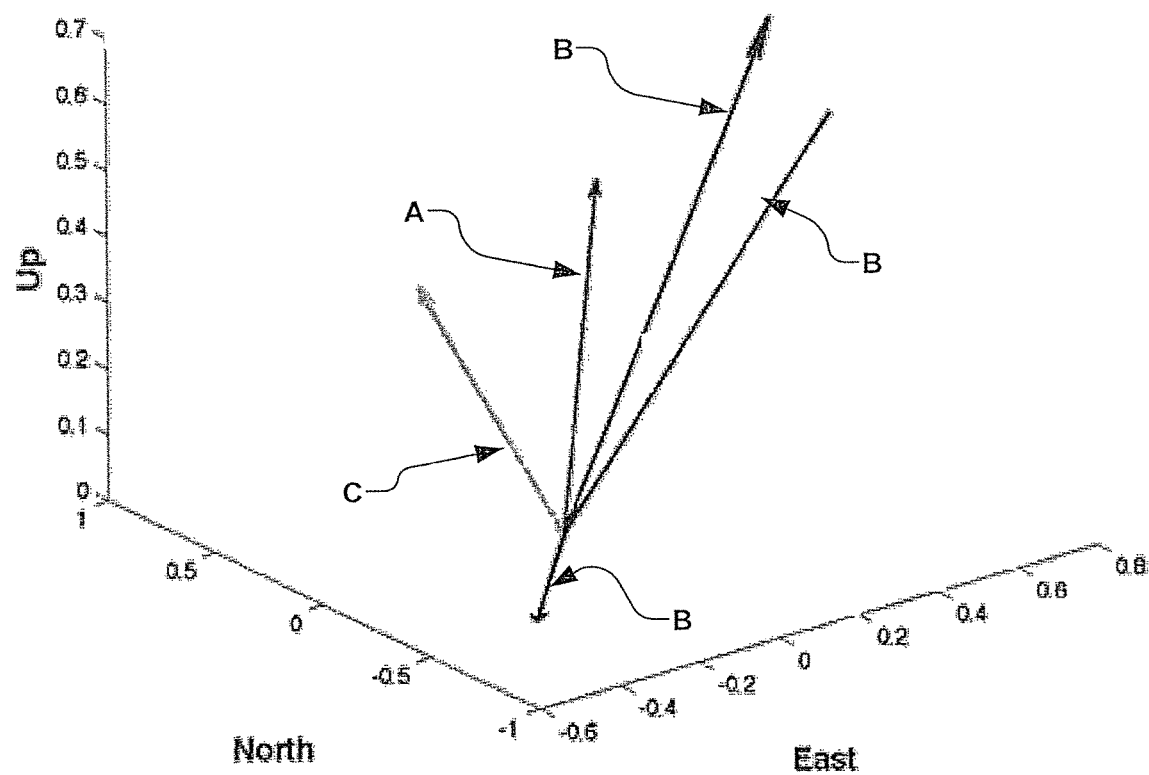
FIG. 16 is a graph of line-of-sight vectors GPS (B), marker 1 (A), and marker 2 (C) as may be used in accordance with one or more embodiments.

FIG. 15 shows the results of introducing uncertainty I the marker position. The scenario shown there introduces a 5 m, 1σ uncertainty (Monte-Carlo) in the marker position. Note that a constant offset of the marker has been omitted for the one-marker case, but will be addressed in the two-marker case.

In the presence of growing marker uncertainty the performance of the full-matrix and k-matrix implementation converge.

Next, Monte-Carlo simulations were run using two markers. The ranges to the markers were 500 m and 2000 m, respectively, with an 18-degree angular separation between the marker LOS unit vectors. Ranges to the marker are long distances considering the operational environment of the UAV. Sensitivity of the method to these ranges has been addressed in.

Figure 17:
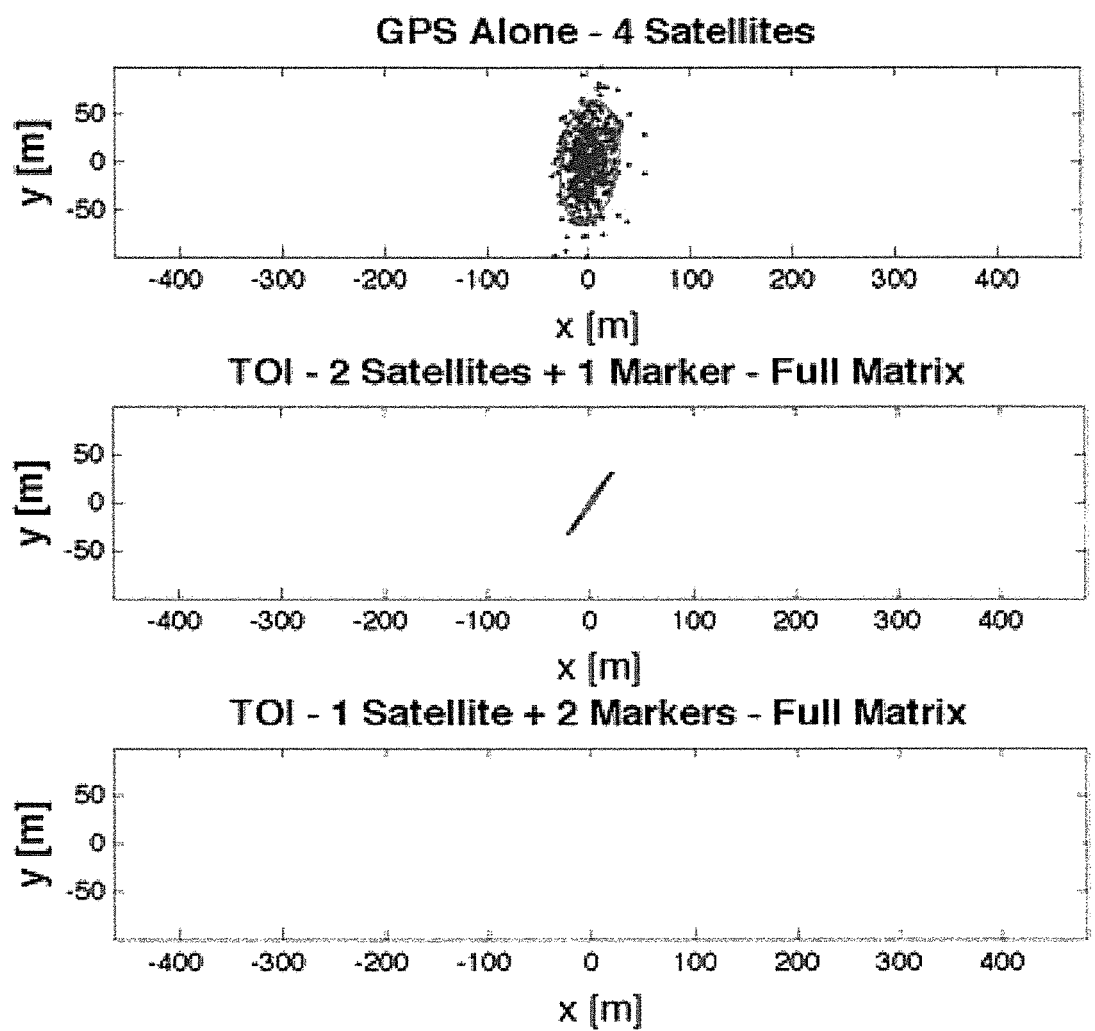
FIG. 17 is a graph showing GPS stand-alone, one-marker and two-marker performance as may be used in accordance with one or more embodiments.
Figure 18:
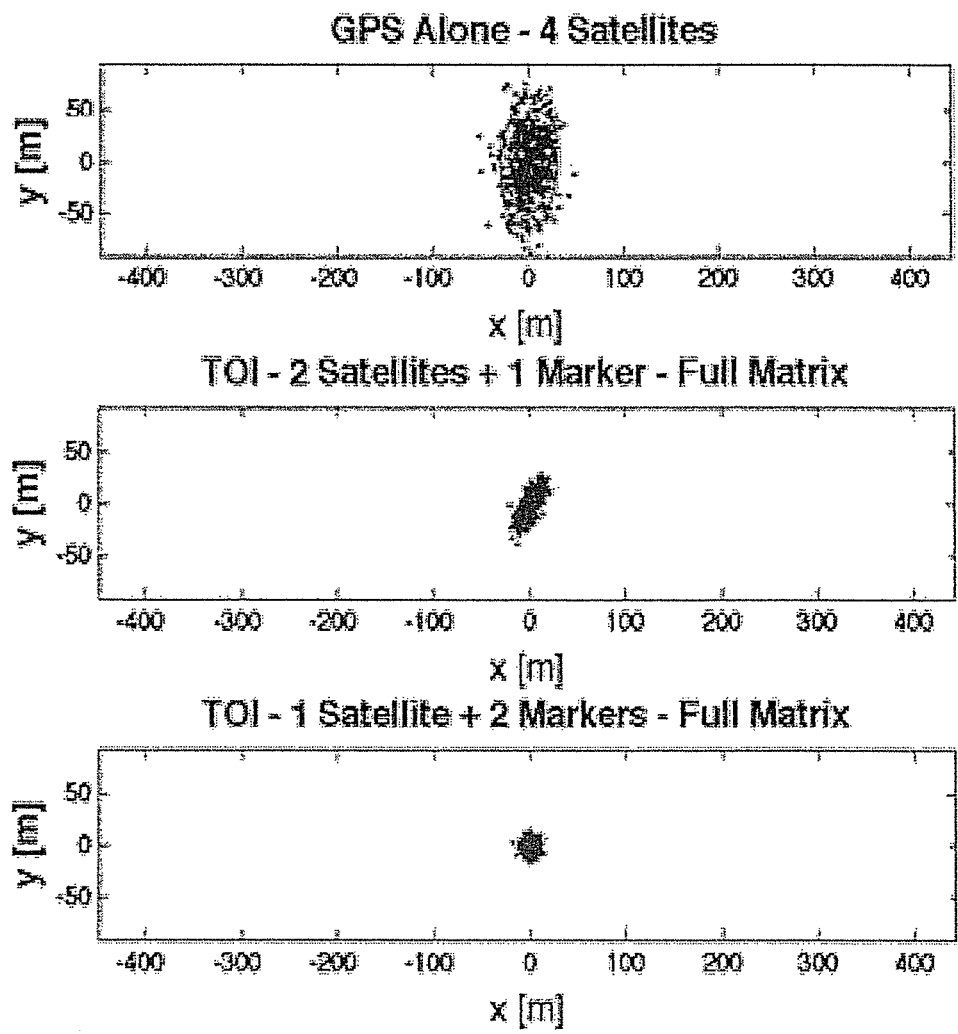
FIG. 18 is an example of GPS stand-alone, one-marker and two-marker performance with marker uncertainty as may be used in accordance with one or more embodiments.

FIGS. 17, 18, 19 and 20 show the results of the Monte-Carlo simulations. Each of the figures shows the results for the GPS standalone solution (top), TOI results using one marker and two GPS satellites (middle), and TOI results using two markers and one satellite (bottom). FIG. 17 shows the results for the Monte-Carlo with no uncertainty in either of the two markers. Clearly, the two-marker case shows that the position uncertainty is about zero. In the two-marker case the presence of GPS does not matter at all. However, those cases may be used for other applications such as clock estimation or integrity monitoring of the GPS ranges.

Next, random uncertainty was introduced in one of the markers (marker 1) with a magnitude of 5 m, 1σ. One can clearly see in FIG. 18 that this uncertainty results in a position uncertainty of similar magnitude.

Figure 19:
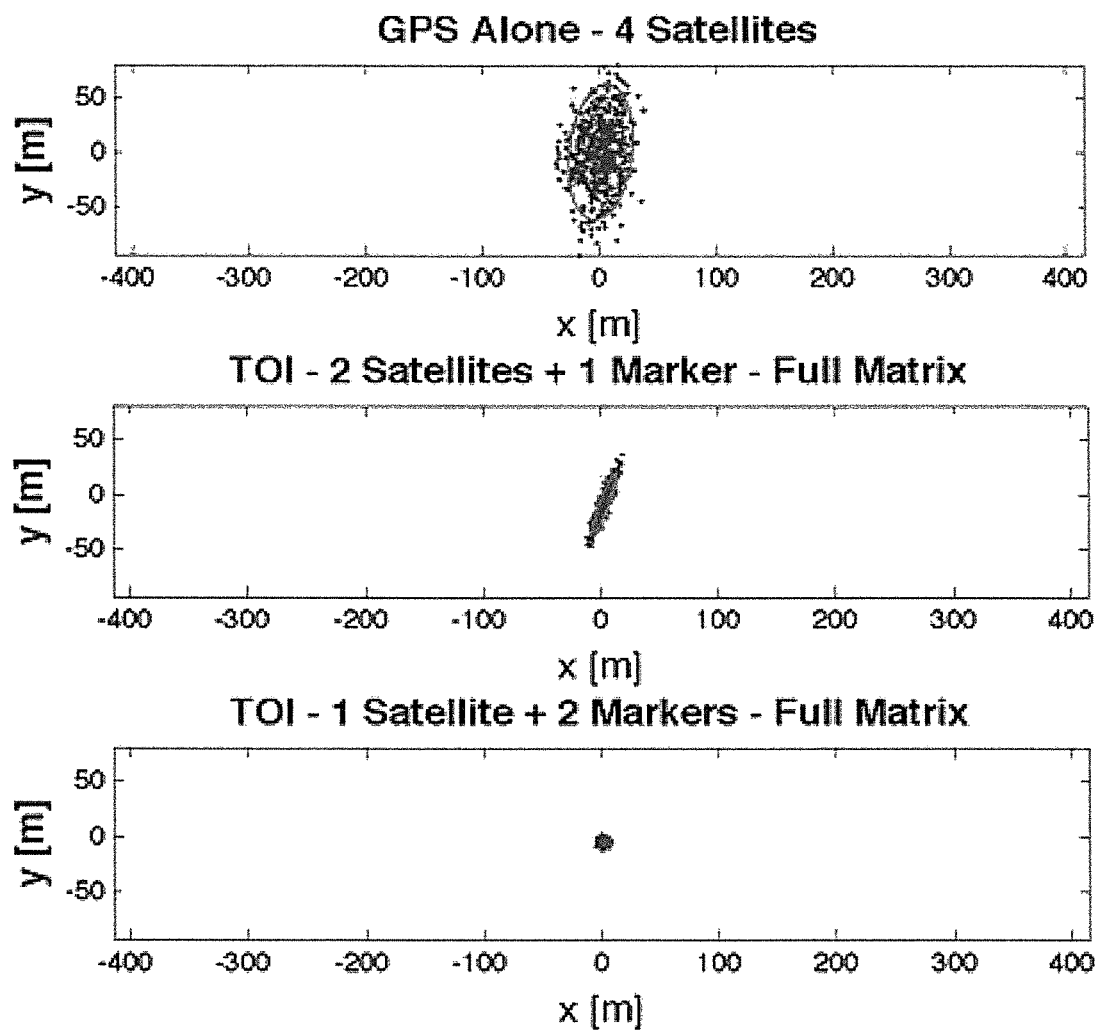
FIG. 19 is an example of GPS stand-alone, one-marker and two-marker performance with marker offset (10 m) as may be used in accordance with one or more embodiments.
Figure 20:
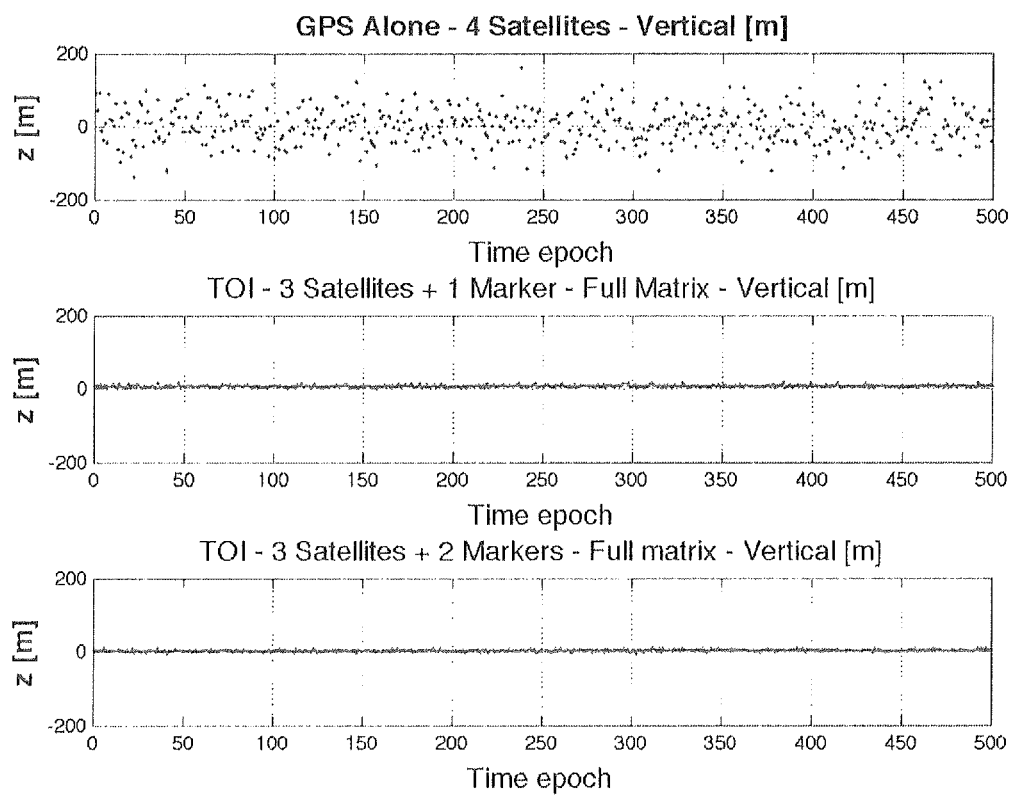
FIG. 20 is an example of Vertical—GPS stand-alone, one-marker and two-marker performance with marker offset (10 m) as may be used in accordance with one or more embodiments.

FIG. 19 shows the performance results when introducing a constant position offset of 10 m in all three dimensions. Furthermore, the uncertainty on the marker was sustained, though at a smaller level of about 2 m, 1σ. The mean values in FIG. 19 are given by (1.2633 m, 0.8849 m), (3.2164 m, −7.8870 m) and (1.7562 m, −4.5297 m), respectively. FIG. 20 shows the vertical position accuracy for this last scenario with mean errors of 1.8656 m, 7.6226 m and 3.6143 m. Observe that the mean error in the two-marker case has been reduced.

In GPS the position accuracies can be related to the UERE by means of Dilution-of-Precision (DOP) factors. For example, for GPS $$\sigma_{x,y,z} = PDOP \cdot \sigma_{UERE} \quad (18)$$

where $$G = (H^T H)^{-1}$$

$$PDOP = \sqrt{G_{11} + G_{22} + G_{33}} \quad (19)$$

In TOI, it is not possible to come up with a simple expression similar to equation (19) for the DOP values including the markers in the geometry. As a result it will be hard to come up with a quantitative measure for the geometry effect in TOI. However, the geometry can still be investigated in an indirect manner from the covariance analysis.

Assuming noise-like uncertainty on the GPS ranges and the TOI 'derived' measurements, the measurement equation can be written as follows:

$$y = \begin{bmatrix} \Delta PR_1 \\ \Delta PR_2 \\ \Delta PR_3 \\ pv_1 \\ pv_2 \\ pv_3 \end{bmatrix} = \begin{bmatrix} \Delta R_1 \\ \Delta R_2 \\ \Delta R_3 \\ v_1 \\ v_2 \\ v_3 \end{bmatrix} + \begin{bmatrix} \varepsilon_1 \\ \varepsilon_2 \\ \varepsilon_3 \\ \varepsilon_{v,1} \\ \varepsilon_{v,2} \\ \varepsilon_{v,3} \\ \varepsilon_{\delta y} \end{bmatrix} = \begin{bmatrix} e_{sv,1}^T & 1 \\ e_{sv,2}^T & 1 \\ e_{sv,3}^T & 1 \\ H_v & 0 \end{bmatrix} \begin{bmatrix} \Delta x \\ \Delta y \\ \Delta z \\ b \end{bmatrix} \quad (20)$$

Now, the covariance of the position change estimate can be found by:

$$\text{cov}\left(\begin{bmatrix} x \\ b \end{bmatrix}\right) = (H^T H)^{-1} H^T \text{Cov}(\delta y) H (H^T H)^{-1} \quad (21)$$

Assuming independent pseudorange measurement, the covariance matrix for the GPS part of the measurement equation is given by:

$$\text{cov}(\delta R) = \sigma_{UERE} I \quad (22)$$

The 'derived' measurement covariance matrix associated with one of the markers is derived as follows:

$$\text{Cov}(\delta v) = E\{(\delta v - E\{\delta v\})(\delta v - E\{\delta v\})^T\} \quad (23)$$
$$= E\{\delta v \delta v^T\}$$
$$= E\{H_v \delta x_m \delta x_m^T H_v^T\}$$
$$= H_v E\{\delta x_m \delta x_m^T\} H_v^T$$

Substituting equations (22) and (23) in equation (21) yields:

$$\text{cov}\left(\begin{bmatrix} x \\ b \end{bmatrix}\right) = (H^T H)^{-1} H^T \begin{bmatrix} \sigma_{UERE} I & 0 \\ 0 & H_v E\{\delta x_m \delta x_m^T\} H_v^T \end{bmatrix} H (H^T H)^{-1} \quad (24)$$

Even though no easy geometry factor can be obtained from the covariance expression in (24), equation (24) can still be used to evaluate the performance for various geometry scenarios.

This section will discuss how GPS range biases can be detected using TOI. The derivation here is similar to the parity space approach discussed in a variety of references.

First, let us first perform the QR decomposition of the system matrix as derived in equations (15) and (17).

$$H = QR = [Q_u \mid Q_p] \begin{bmatrix} R_u \\ 0 \end{bmatrix} \quad (25)$$

Since, for an over-determined system, the R matrix consists of an upper-triangular matrix for the upper four rows and a zero matrix for the remaining rows, the QR decomposition effectively breaks the system equation into two new equations:

$$y = H \Delta x = QR \Delta x \Rightarrow$$
$$Q_u^T y = R_u \Delta x \Rightarrow \Delta x = R_u^{-1} Q_u^T y$$
$$Q_p^T y = 0 \quad (26)$$

Whereas, the tenth equation can be used to find the estimate of the position change $\Delta x$, the eleventh equation represents the null-space of the system matrix. This space is often referred to as the parity space. The significance of the parity space can be observed if we consider the following failure scenario of a single bias on one of the satellites:

$$\tilde{y} = \begin{bmatrix} \Delta PR_1 \\ \Delta PR_2 \\ \Delta PR_3 \\ pv_1 \\ pv_2 \\ pv_3 \end{bmatrix} = \begin{bmatrix} \Delta R_1 \\ \Delta R_2 \\ \Delta R_3 \\ v_1 \\ v_2 \\ v_3 \end{bmatrix} + \begin{bmatrix} \varepsilon_1 \\ \varepsilon_2 \\ \varepsilon_3 \\ \varepsilon_{v,1} \\ \varepsilon_{v,2} \\ \varepsilon_{v,3} \\ \varepsilon_{\delta y} \end{bmatrix} + \begin{bmatrix} 0 \\ b \\ 0 \\ 0 \\ 0 \\ 0 \\ 0 \end{bmatrix} = \begin{bmatrix} e_{sv,1}^T & 1 \\ e_{sv,2}^T & 1 \\ e_{sv,3}^T & 1 \\ H_v & 0 \end{bmatrix} \begin{bmatrix} \Delta x \\ \Delta y \\ \Delta z \\ clk \end{bmatrix} \quad (27)$$

Substituting equation (27) into the parity equation yields:

$$Q_p^T \tilde{y} = Q_p^T (y + \delta y + b) \quad (28)$$
$$= Q_p^T y + Q_p^T \delta y + Q_p^T b$$
$$= Q_p^T \delta y + Q_p^T b = p$$

The expected value for the parity space value is given by:

$$E\{p\} = E\{Q_p^T \delta y + Q_p^T b\} \quad (29)$$
$$= Q_p^T E\{\delta y\} + Q_p^T E\{b\}$$
$$= Q_p^T b$$

which is a projection of the bias error on the axes of the parity space.

Figure 21:
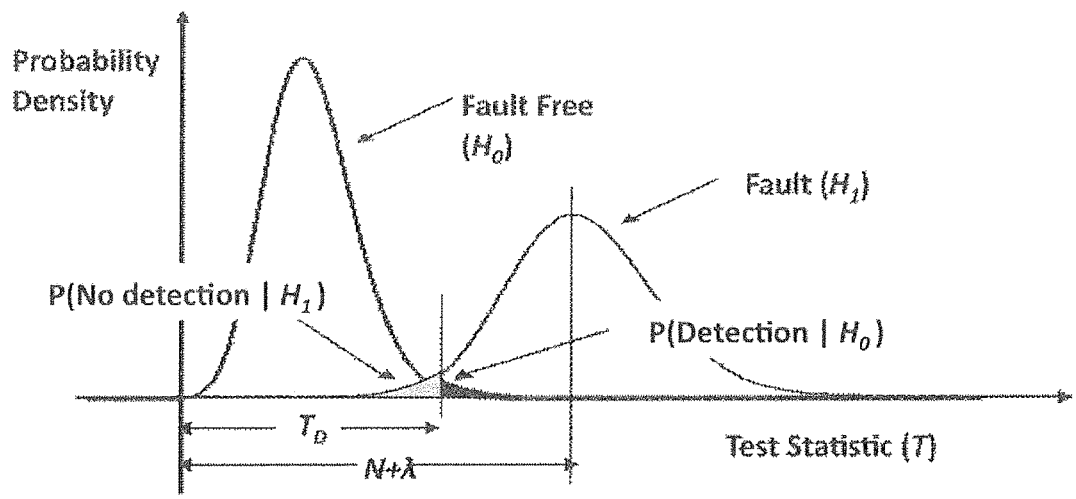
FIG. 21 is a simple diagram of probability density function: fault tree and faulted performance as may be used in accordance with one or more embodiments.

The parity residual value can thus be used to perform failure detection of GPS bias errors by comparing it to a predetermined threshold derived from the probability of false alert (see FIG. 21). The implementation of the whole fault detection and possible isolation algorithms is outside the scope of this paper.

Figure 22:
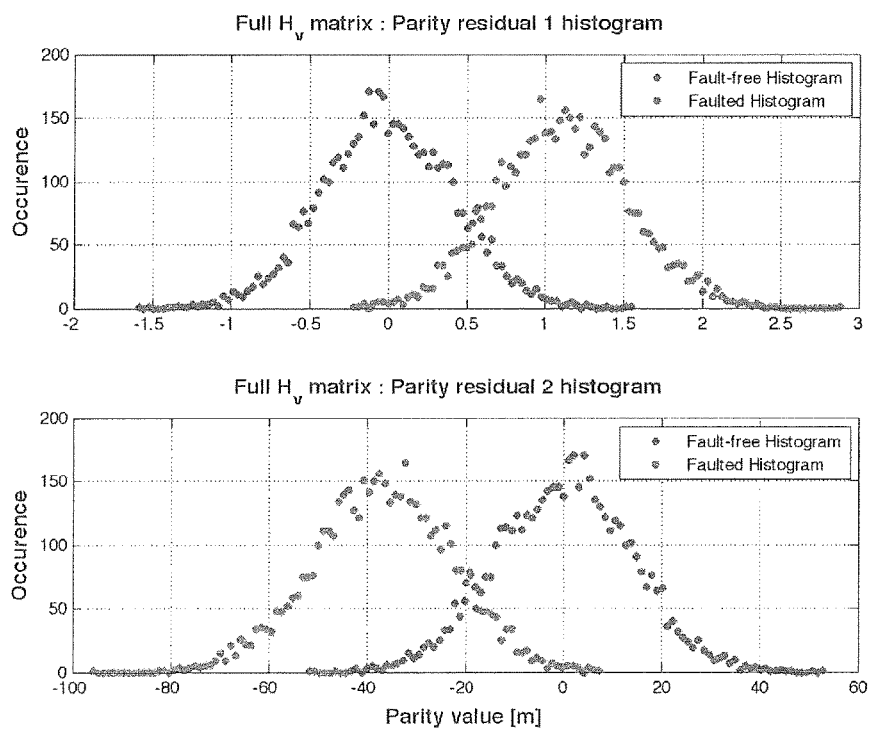
FIG. 22 is an example of parity residuals for fault-free case (left upper distribution and right lower distribution) and faulted case (right upper distribution and left lower distribution) with 3 SVs and 1 marker as may be used in accordance with one or more embodiments.
Figure 23:
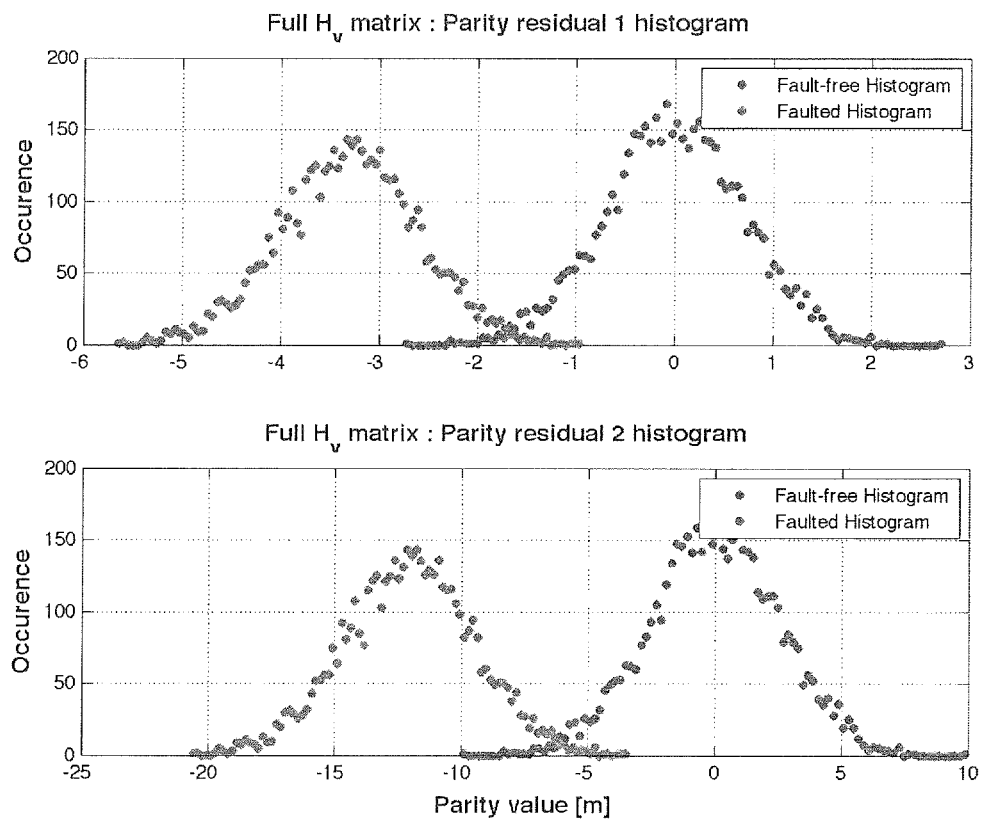
FIG. 23 is an example of parity residuals for fault-free case (right upper and lower distributions) and faulted case (left upper and lower distributions) with 2 SVs and 2 markers as may be used in accordance with one or more embodiments.

To evaluate the capability of TOI to detect GPS bias failures various 5000-point Monte-Carlos were performed. For the faulted case a range bias of 100 m was introduced on one of the satellites. Then, TOI was implemented for two scenarios: three GPS satellites+one marker and two GPS satellites+two markers. FIGS. 22 and 23 show the histogram of the parity residuals for the fault-free case (blue) and the faulted case (red).

It can be observed from FIGS. 22 and 23 that the optical markers can be exploited to detect bias errors in GPS ranges. Furthermore, the inclusion of more markers in the detection scheme improves the observability of the bias errors in parity space. Note that in both cases the parity space is one-dimensional and the corresponding histograms show Gaussian-like distributions due to the Gaussian error inputs. In case of a multi-dimensional parity space the sum of the squared parity residuals could be used a test statistic.

Detection of faults in the marker position has not been investigated in this paper and will be part of future work.

TOI has potential as an integrated navigation system but does require 'a priori' knowledge of feature locations (markers) in the environment or a capability to "derive" the markers in-flight. Unlike GPS, geometry is not as easily expressed with a Dilution of Precision metric; however, an equation was derived for the covariance of the position as a function of the UERE and the uncertainty in the marker location. Utilization of multiple markers allow for solution of position with and without GPS and markers can be exploited to detect bias errors in the GPS pseudoranges.

The objective of this disclosure is to demonstrate the sensitivity of the GPS-Camera Tight Optical Integration (TOI) algorithm to errors stemming from two sources; (a) Inertial measurement errors and, (b) Camera measurement errors. The TOI algorithm has been described by the authors in an recent paper, "An Algorithm for GPS Tight Optical Integration (TOI)".

In the TOI algorithm, the inertial measurements are primarily used to derive attitude information to transform the camera measurements from the body frame to the navigation frame of reference. Clearly, errors on these inertial measurements contribute directly to the angular information from the camera used for a final position solution. Also, an initial position estimate is required to transform the measurements from the navigation frame of reference to an earth reference frame. As a result, an error in the initial position estimate will introduce some error in the position solution, which is included as an equivalent inertial error in the overall error analysis.

The function of the camera is to make angular measurements from a pre-defined "marker". The errors in these measurements are sensitive to the range of the marker from the camera, i.e. marker range. Although the marker range is not a measurement used in the algorithm, it is necessary to investigate the sensitivity of the algorithm to variations in the marker range. It is shown that the sensitivity of the error in the final position estimate increases as this marker range increases. Moreover, the camera needs to identify the marker and hence, an error in the pixel selection in the image or a marker position error will affect the accuracy of the final position estimates. The sensitivity of the algorithm to these errors contributed by the camera is also analyzed.

Finally, the authors explore the possibility of using multiple markers to obtain the necessary attitude information. The potential for using this attitude information to correct for or limit the drift in the inertial error is evaluated.

The TOI algorithm performance is shown to be similar to GPS performance levels, in the presence of the error sources discussed above. This makes it a viable solution for navigation capabilities in environments where sufficient satellites for a GPS only solution are not available, e.g. an urban canyon.

Currently, significant research efforts are being focused in the area of sensor integration for navigation. This is primarily because available navigation aids fail to meet performance requirements, e.g., accuracy, integrity, availability, continuity, etc. for various applications if used in a stand-alone fashion. Sensor fusion allows for the development of navigation units that can meet the performance criteria for the specified application.

Among the more mature sensor fusion topics is GPS-INS integration. Presently, significant work is being done in the area of integrating optical sensors with Global Navigation Satellite Systems (GNSS) or Inertial Measurement Units (IMU). One aspect of this area has been driven by the interest in range finding optical sensor technology, i.e. Light Detection And Ranging (LiDAR) and their integrations with GNSS, IMUs, terrain databases, etc. The other area of interest is driven by the more human vision inspired optical sensor, i.e. the camera.

The Tight Optical Integration (TOI) is a method for the fusion of GPS and camera measurements. This method is extendable to the integration of the camera with any GNSS system. Since the preliminary analyses, simulation, and tests have been performed using GPS data, we will refer to this as a GPS—camera integration topic for the scope of this paper. This paper will discuss some of the measurement error sources in the TOI algorithm and their impact on the user position error. It will be shown that the algorithm converges to a solution in the presence of angular and inertial errors induced into the "perfect" camera measurements.

The TOI algorithm is an algorithm for integrating angular measurements from a camera image and range measurements from GPS to generate a navigation solution. The term "tight" stems from the fact that that TOI does the blending at the raw measurement level and not in the position domain. The potential for use of this algorithm is in situations where some GPS satellites are visible but not sufficient enough to form a GPS only position solution. The premise of the research in this topic is that these visible satellites (less than 4) can still be used to obtain a position solution, if aided by the angular measurement to an identifiable marker. The algorithm performs the blending of these measurements in a least squares geometry matrix very similar to the classical geometry matrix used for GPS position solution. This implies that the integration of these two sensors, GPS receiver, and the camera can be done in existing GPS receivers with minimal changes to the present architecture of the equipment. It is important to note that this algorithm is applicable and useful given that image processing, feature recognition and tracking algorithms are already in place to generate the unit vector from the camera image.

TOI is an integration algorithm that finds direct applications in urban canyon type environments. One of the classical cases in an urban canyon environment is the blockage of satellite signals due to skyscrapers and other landmarks. TOI benefits in using these signal blocking landmarks to provide the features that aid the navigation solution and increases availability.

The camera is the optical sensor used to aid the GPS receiver. The measurement of the camera is the unit vector pointing to a feature of interest or marker. As the camera "sees" the marker it can be identified in the camera image in terms of pixels. An inverted image of the feature is formed on the charged cathode device (CCD). The rectified image is formed on the image plane which is present in the raw data. Feature extraction algorithms such as Scale Invariant Feature Transformation (SIFT), Speeded Up Robust Features (SURF), Hough Transforms, etc. can be implemented to extract pixels corresponding to the feature of interest. Camera calibration techniques can be used to generate a unit vector pointing from the focal point to the pixel on the rectified image plane. This unit vector must lie on the line joining the focal point to the marker. Since the range to the marker cannot be identified from the image alone, the unit vector becomes the primary measurement of the image.

Figure 24:
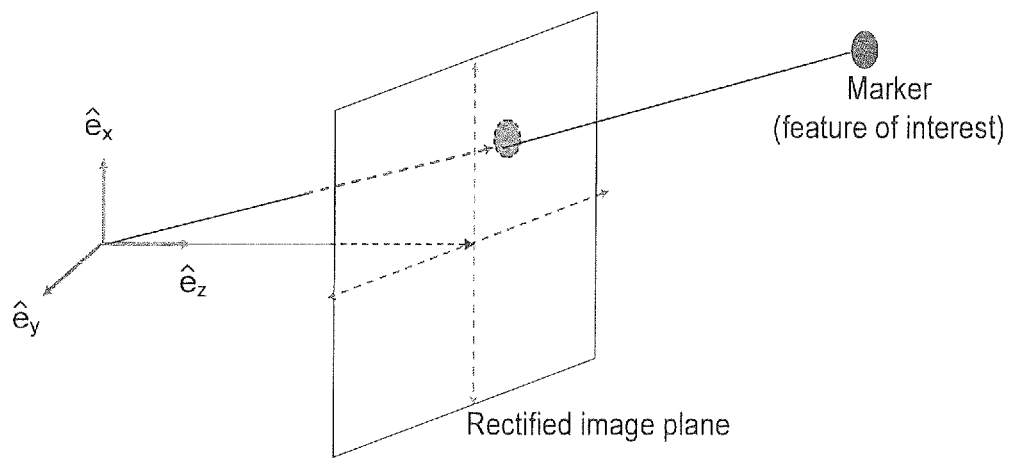
FIG. 24 is an example of unit vector from the focal point to the marker as may be used in accordance with one or more embodiments.

FIG. 24 shows illustrates the formation of this unit vector pointing from the optical center (focal point) to the feature of interest. This unit vector has been decomposed into three orthogonal components as shown.

$$\hat{e}_v = e_x + e_y + e_z \quad (30)$$

where,
$\hat{e}_v$=The unit vector from the focal point of the camera to the marker
$e_x$=x-component of the unit vector
$e_y$=y-component of the unit vector
$e_z$=z-component of the unit vector The theory and practice of feature extraction techniques is beyond the scope of the experiment described in this paper. From this point forward, the feature of interest will be referred to as the 'marker' and the unit vector pointing to the marker as $\hat{e}_v$.

Figure 25:
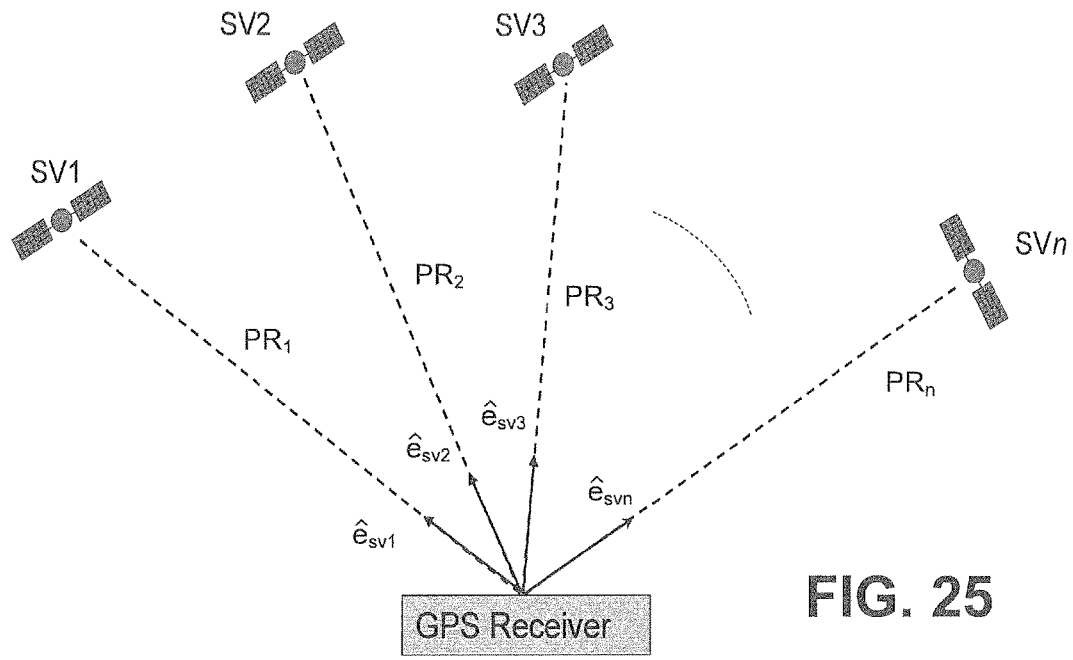
FIG. 25 is an example of GPS satellite geometry as may be used in accordance with one or more embodiments.

The fundamental measurement in GPS is 'time'. The receiver measures the time of arrival of the signal from a satellite, decodes the time of transmission of the signal at the satellite, the satellite position, and estimates the distance (or range) between the satellite and the user. This measurement is popularly called the pseudorange because of the presence of various errors in the measurement. FIG. 25 shows example GPS satellite geometry with n satellites in view of the GPS receiver (the user).

The unit vectors to the satellites, $\hat{e}_{sv}$ are formed based on the knowledge of the satellite positions and an estimate of the user position.

The user position in three dimensions $x=[x_u, y_u, z_u]$ and the user clock bias estimate can be determined by making measurements to at least four satellites. The solution for user position requires linearization of the pseudorange equation as given below.

$$\rho_n = \|s_n - x\| + ct_u \quad (31)$$

where,
$\rho_n$=Pseudorange measurement to the nth satellite
$s_n$=Satellite position vector, $[x_s, y_s, z_s]$
c=Speed of light in vacuum (or free space)
$t_u$=Receiver (user) clock offset from system time The offset of the user position vector from the initial estimate and clock offset, after linearization are related to the pseudorange measurements by following equation.

$$[H][\Delta x] = [\Delta \rho] \quad (32)$$

where,
$\Delta x$=Offset in the estimate of user position with clock offset
$\Delta \rho$=Vector offset in pseudorange values corresponding to the user's true position and the linearization point $$H = \begin{bmatrix} \hat{e}_x^{SV1} & \hat{e}_y^{SV1} & \hat{e}_z^{SV1} & 1 \\ \hat{e}_x^{SV2} & \hat{e}_y^{SV2} & \hat{e}_z^{SV2} & 1 \\ \hat{e}_x^{SV3} & \hat{e}_y^{SV3} & \hat{e}_z^{SV3} & 1 \\ \vdots & \vdots & \vdots & \vdots \\ \hat{e}_x^{SVn} & \hat{e}_y^{SVn} & \hat{e}_z^{SVn} & 1 \end{bmatrix} \quad (33)$$

H is the direction cosine matrix, or Jacobian matrix, formed from the unit vectors to the satellites. In the equation, $\hat{e}_x^{SVn}$ refers to the x-component of the unit vector to the nth satellite. The y- and z-components are denoted by corresponding subscripts.

The solution to the above equation requires iteratively solving for $$\Delta x = (H^T H)^{-1} H^T \Delta \rho.$$

There are various error sources that influence this pseudorange measurement, e.g. clock errors, ephemeris errors, multipath, atmospheric effects, antenna errors, etc. Error characterization and analysis for GPS is well researched topic and will not be discussed in this paper.

Figure 26:
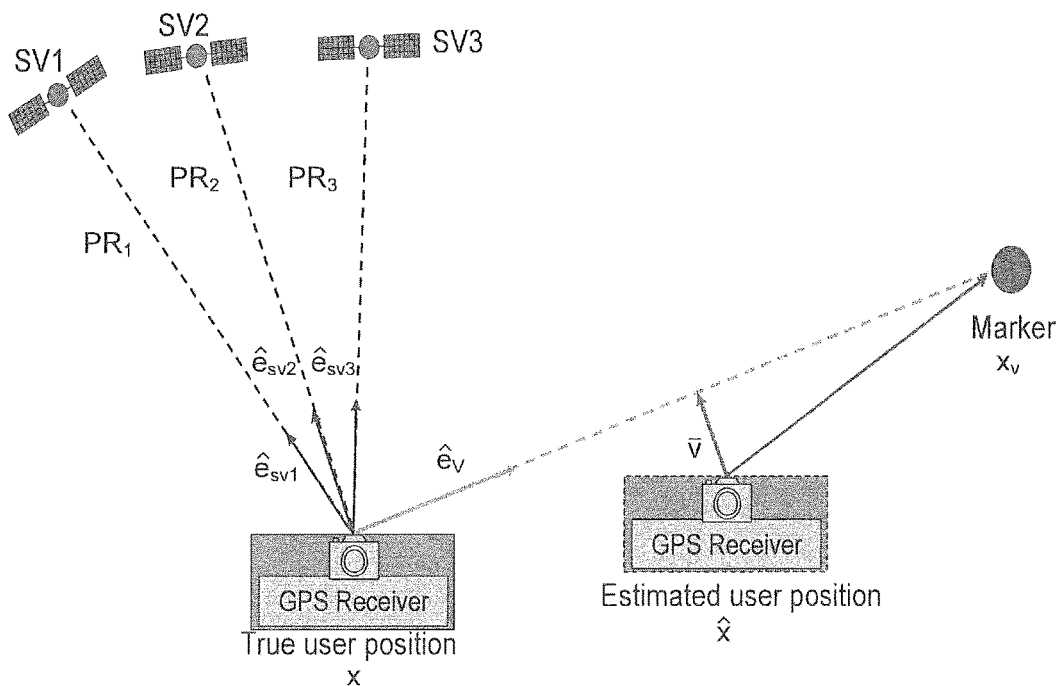
FIG. 26 is an example of the TOI iteration concept as may be used in accordance with one or more embodiments.

As already stated, the TOI algorithm provides a method to integrate pseudorange measurements from GPS satellites and angular measurements from an optical imaging sensor, i.e. the camera. FIG. 26 illustrates a simple geometry with 3 satellites and an optical marker in view. The iteration of the algorithm involves two convergence forces; one by the unit vector measurement to drive the estimated user position to the line joining the marker and the true user position, and second, by the pseudorange measurements from the GPS receiver to the to a point on the line. Note, that by this geometry, a minimum of 2 GPS satellites and an angular measurement are sufficient for obtaining a position solution.

For a mathematical perspective into the algorithm, consider the convergence vector $V=[v_1 \ v_2 \ v_3]$, and a line from the true user position to the marker, hereby defined as $l_v(x_v, e_v)$. Then, v is the vector pointing from the estimated user position, $\hat{x}$ to $l_v(x_v, e_v)$. This vector can be derived from the unit vector measurement as, $$v = [I + e_v e_v^T](x_v - \hat{x}) \quad (34)$$

where,
I=3×3 identity matrix
$x_v$=Position vector of the marker
A simple and approximate equation to relate v with user position is, $$\Delta x = v$$

This introduces the constraint on the convergence to the line imposed by the unit vector measurement. Towards the position solution steps, we define a geometry matrix, T similar to the one used in the GPS least squares solution.

$$T = \begin{bmatrix} H & 1 \\ kI & 0 \end{bmatrix} \quad (35)$$

Here, the H matrix is the same as that used in the GPS geometry matrix. The difference is that it may have an insufficient number of satellites for a stand alone GPS solution. I is the 3×3 identity matrix as described before. k is a camera weighting factor introduced to de-weight the camera measurement in the matrix and avoid matrix singularities. The variation in this factor has not produced any observable change in performance but does affect the speed of convergence of the algorithm to the right solution. It's variation depends primarily upon the quality of the camera and GPS measurements, since it allows to de-weight the camera measurement.

Following a linearization technique as done in the GPS solution algorithm, the measurement equation can be written as, $$y = Tx \quad (36)$$

where,
$y = [\Delta PR_1 \ \Delta PR_2 \ \Delta PR_3 \ v_1 \ v_2 \ v_3]^T$, for the case of 3 visible GPS satellites.

The ordinary least squares estimate of the user position can then be written as, $$\Delta x = (T^T T)^{-1} T^T y$$

Camera Error

The camera provides the angular measurement necessary for the TOI algorithm. The extraction of this measurement involves, among others, the following steps:

Camera calibration is required to map the pixel associated with the marker into a direction cosine to form the unit-vector measurement.

Camera alignment is necessary to correctly interpret attitude information and transform angular information from b-frame to e-frame. This involves the appropriate alignment of the camera on the user vehicle and/or equipment.

Alignment of camera lens, image plane with respect to focal point is necessary to correctly form the unit vector in the geometry involved inside the camera.

Feature extraction is required to interpret the correct pixel(s) associated with the marker for which the measurement is used.

Since the range to the marker is not available directly from the camera measurement, an accurate knowledge of the marker position is currently required. The confidence in the knowledge of this position will influence the error in the measurement.

Figure 27:
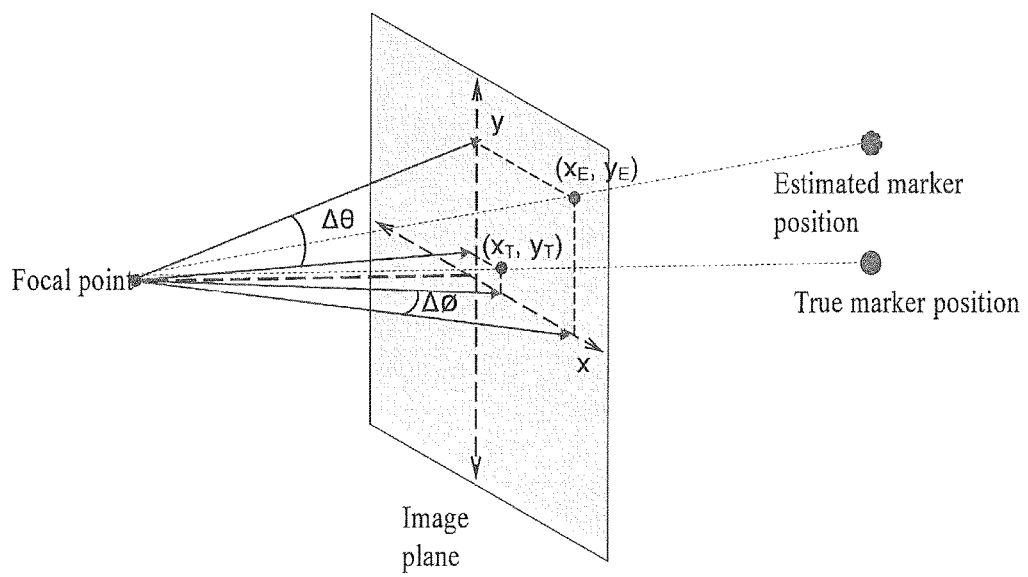
FIG. 27 is an example of decomposition of camera angular error as may be used in accordance with one or more embodiments.

Errors in any of the above steps translate directly to an angular error, i.e. choosing the wrong unit vector. The unit vector error can be decomposed into two components; (i) Error in the x-plane, and (ii) Error in the y-plane. FIG. 27 shows this decomposition of the angular error.

As can be seen in the illustration, an error in the wrong pixel selection of forming the wrong unit vector can be simulated as having two components along the orthogonal axes.

Inertial Errors

Figure 28:
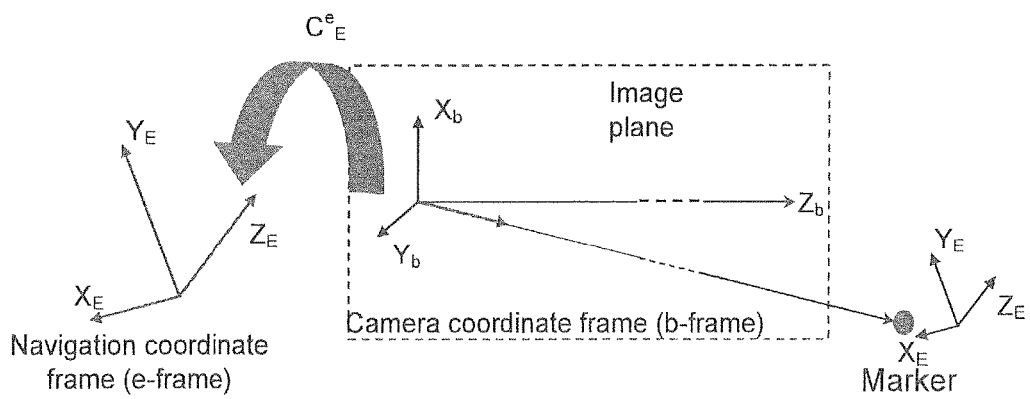
FIG. 28 is an example of a camera body to navigation frame of reference translation as may be used in accordance with one or more embodiments.

The necessity to consider inertial errors stems from the need to know the orientation of the camera. The camera measurements are formed in the body frame (b-frame) of the equipment (of the user). However, GPS measurements are available in an Earth-Centered-Earth-Fixed (ECEF) frame. As a result, for integrating these two measurements, the attitude information of the camera is necessary to transform the camera measurements from the body frame to the chosen navigation frame of reference. FIG. 28 illustrates this idea.

In this experiment, the chosen frame of reference is the ECEF frame (e-frame). In a practical setup and especially for a dynamic user, it would be required to consider a rotating navigation frame of reference involving transport rate computations. This is driven by practical considerations of mounting the gyroscopes and alignment with an accelerometer. In a simulation it is acceptable to transform directly from the b-frame to the e-frame. This keeps the focus on evaluating the performance of the algorithm in the presence of angular and attitude measurement errors. This is the approach we have taken in this paper.

Since accelerometers' outputs are not used for the position solution, only the gyroscope outputs are required to obtain information about body orientation. Hence, the attitude updating algorithm for the earth frame mechanization is of interest. The attitude updating equation for the e-frame is given by $$\dot{C}_b^e = C_b^e \Omega_{eb}^b \qquad (37)$$

$$\omega_{eb}^b = \omega_{ib}^b - C_e^b \omega_{ie}^e \qquad (38)$$

where, $C_b^e$=Direction cosine matrix for transformation from b-frame to e-frame $\omega_{eb}^b$=Angular rate of the b-frame with respect to the e-frame, expressed in the b-frame $\Omega_{be}^b$=Skew-symmetric form of $\omega_{eb}^b$ $\omega_{ib}^b$=Angular rate vector expressing orientation of the b-frame with respect to the inertial frame, expressed in the body frame $\omega_{ie}^e$=Rotation rate of the of the e-frame with respect to the inertial frame, expressed in the e-frame $$C_e^b = (C_b^e)^T \qquad (39)$$

In the above equations, the only unknowns are the initial attitude, the b-frame angular rate with respect to the e-frame, and the earth's angular rate. The initial attitude is obtained from initialization information and the gyroscope outputs provide the information b-frame angular rate with respect to the e-frame. The earth rate is a constant of 15.041067 degrees per hour, which is derived from the fact that the earth rotates one geometric rotation each sidereal day (23 hrs 56 minutes 4.1 sec).

Clearly, the dominant source of error is the measurement error from the gyroscopes and that of initial attitude. These errors can be interpreted as translating the unit vector incorrectly from the b-frame to the e-frame.

Range to the Marker

Although the range to the marker is not used in the algorithm it influences the performance of TOI. It is intuitive that the magnitude of position error will be directly proportional to the line of sight distance between the marker and the user. The range to the marker also plays an important role because the specifications of the camera being used determine the range to which a feature can be observed to be tracked with some confidence.

All of the above errors are simulated and introduced in the measurements of the TOI to evaluate the sensitivity of the algorithm to these errors. It is expected that the position error is a function of the product of the tangent of angular error and marker range.

GPS Data

A combination of real GPS constellation data along with simulated pseudorange data is used for the GPS measurements. GPS constellation data was collected by a stationary user at the Ohio University Airport, Albany Ohio. The pseudorange measurements were synthesized from a zero-mean Gaussian distribution with a standard deviation of 5 meters. The reason to simulate the pseudorange data was to isolate and analyze the effects of the non-GPS measurement errors only.

Marker Simulation

The camera data is simulated by using the unit vector to a GPS satellite and then ignoring the pseudorange measurement to that satellite. The unit vector to the satellite is treated as being the angular measurement available from the camera. This is consistent with the idea that an optical marker is available in the same angular position as the blocked satellite.

From the constellation of available satellites, sets of four satellites were chosen at a time. Within this set of 4 pseudorange measurements, 3 of them were used as GPS measurements and the unit vector to one of them was used as the simulated marker. This was repeated until each satellite within the set of 4 was simulated as the marker once. This was then again repeated till all possible combinations of 4 satellites in view were exhausted. This is methodology was used to initially test the convergence of the algorithm.

The knowledge of the unit vector also allows for simulating this marker at known marker ranges, although the marker range information was not used in the algorithm implementation.

Error Simulation

The angular errors for the camera were simulated based on reasonable specifications of a cheaply (~$50) available camera. It is can be expected that an error of 5 pixels is very significant for such a camera with a resolution of 320×240 pixels and a focal length of about 400 pixels. This translates to an error of approximately 1 degree. This 1 degree error was simulated along both the x- and y-components of the camera image plane. Then the errors were simulated from a zero-mean unit-variance Gaussian distribution and the results were obtained in terms of position error.

The errors in inertial measurements were simulated as arising from two sources; a gyro misalignment of 0.25 degrees, and a constant gyro drift of 36 degrees per hour. The position error was plotted for this case.

Then the errors from both these sources were combined and the position error was plotted.

Finally, the position errors were analyzed with all of the above errors at different marker ranges.

The above methodology of synthesizing camera and GPS data allows for a direct comparison of the GPS and TOI errors with identical geometry. Also simulation assumes a priori knowledge of the location of the marker.

The following section shows the plots of the position error obtained by implementing the TOI algorithm for the various error cases listed in the previous section. The metric for performance measurement is the mean and standard deviation on the position error. This position error is computed as the error in the user solution from the true known location of the user. The true position of the user was obtained from a survey by the Online Positioning User Service (OPUS).

Figure 29:
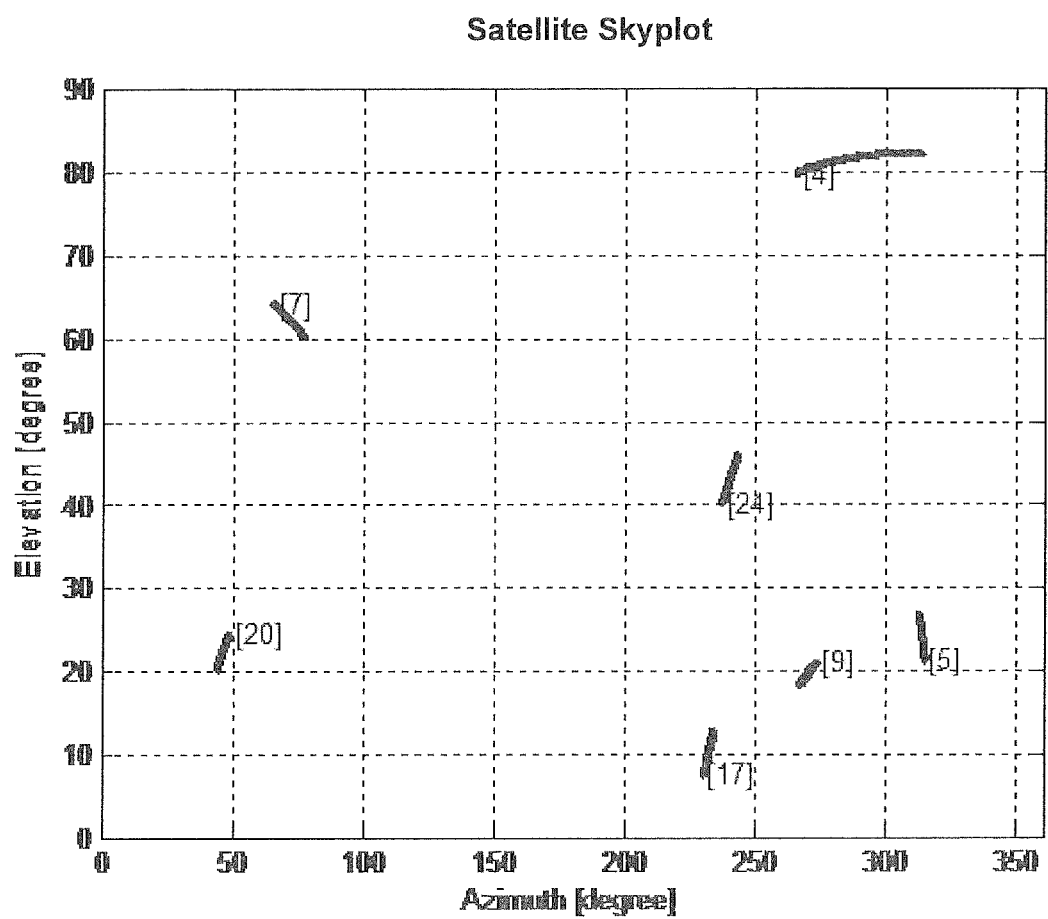
FIG. 29 is a simplified diagram of skyplot of GPS constellation data as may be used in accordance with one or more embodiments.

FIG. 29 shows the elevation and azimuth of the GPS satellites available in the data when collected at the Ohio University airport.

Figure 30:
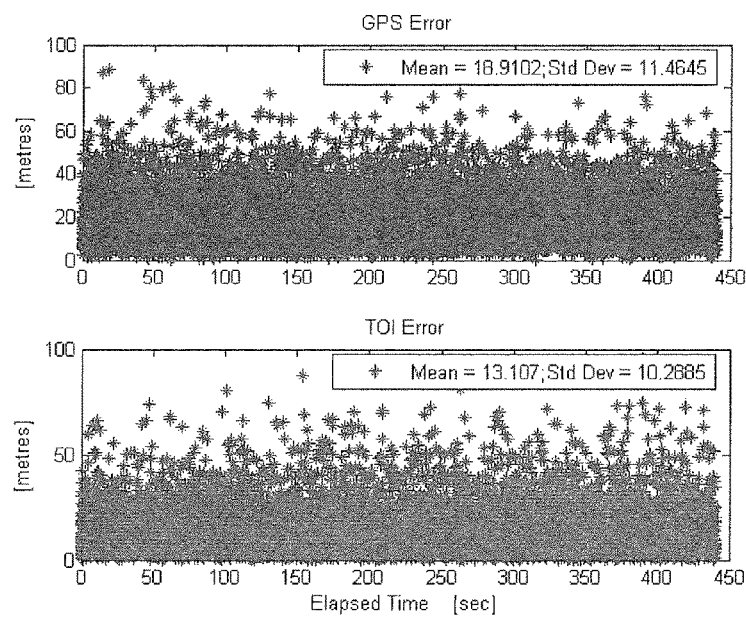
FIG. 30 is an example of GPS and TOI errors without angular and attitude errors as may be used in accordance with one or more embodiments.

FIG. 30 shows the plots for GPS stand alone errors and TOI errors. No angular and attitude errors were simulated and the marker was placed at 250 meters. The plot shows that the TOI performance is better in terms of position error than GPS stand alone solution.

Figure 31:
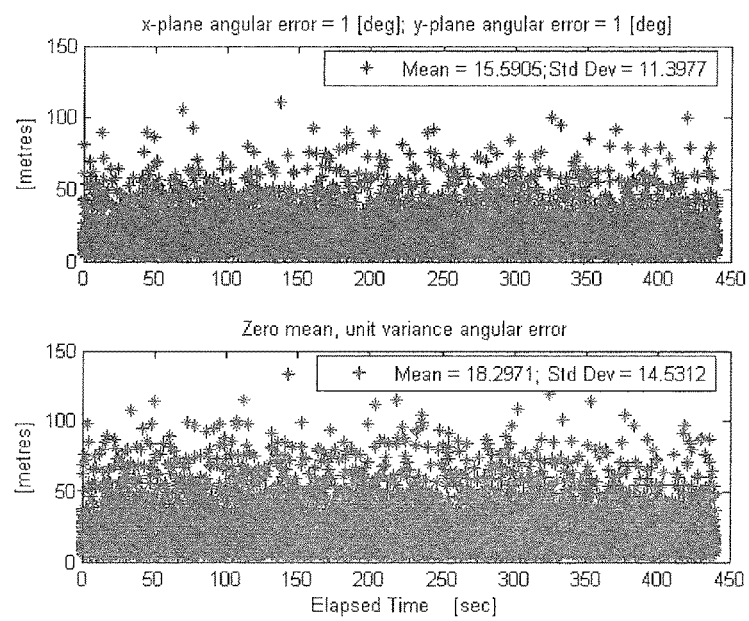
FIG. 31 is an example of TOI error for constant and random angular errors as may be used in accordance with one or more embodiments.

FIG. 31 shows the errors in TOI position solution for the cases where the angular measurement error is 1 degree in each of the orthogonal axes, and when the error is from a random distribution. Clearly there is performance degradation but not significant enough to get worse than GPS stand alone position solution.

Figure 32:
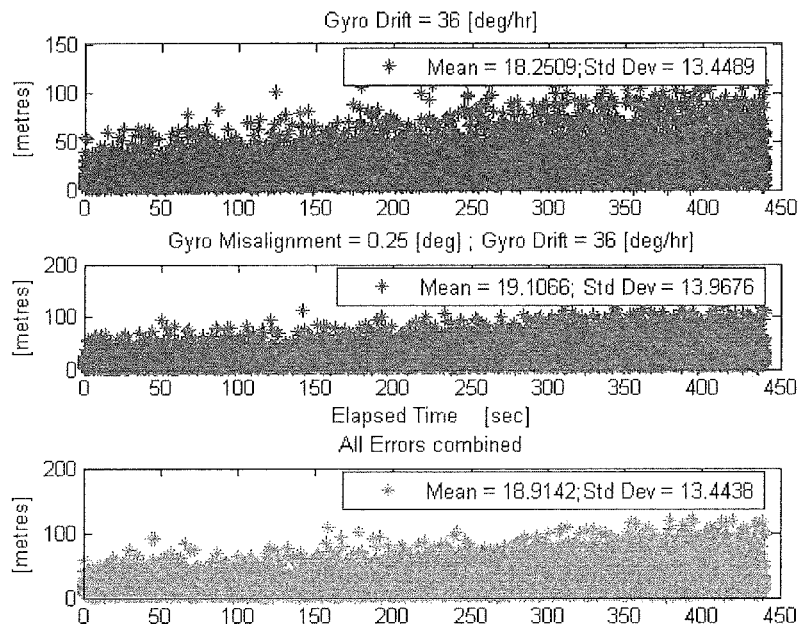
FIG. 32 is an example of TOI error with attitude and angular errors combined as may be used in accordance with one or more embodiments.

FIG. 32 illustrates the position errors for three cases; (i) there is a gyro drift of 36 degrees per hour, (ii) there is gyro misalignment of 0.25 degrees but no gyro drift, and (iii) gyro drift and gyro misalignment errors together. Note that the angular errors were also present along with the gyro errors.

It is seen here that the gyro drift has the most significant impact on the errors as compared to the angular error or a misalignment error. The mean of the position error over 440 seconds of data was about 18 meters with a growing trend with increasing time. This is expected since the drift error accumulates over time.

Figure 33:
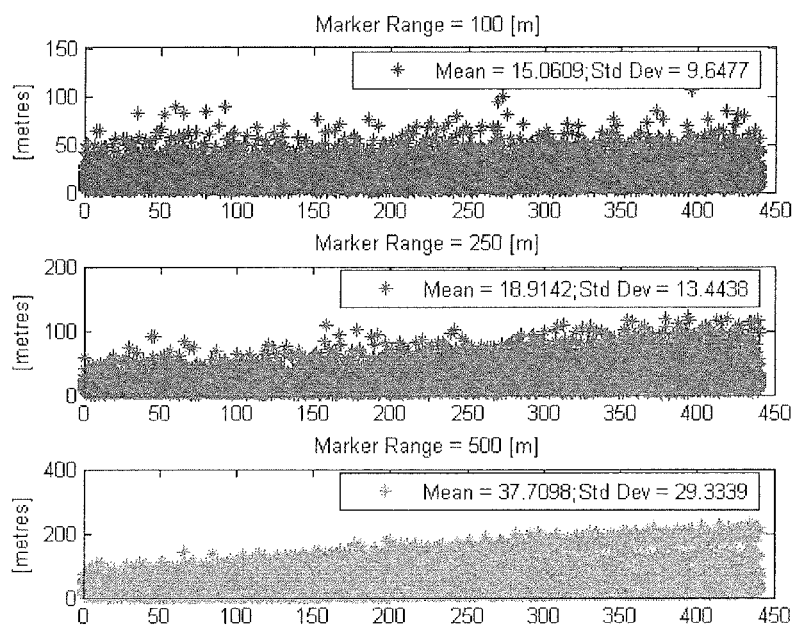
FIG. 33 is an example of TOI errors with angular and inertial errors for varying marker ranges as may be used in accordance with one or more embodiments.

Finally, FIG. 33 illustrates the sensitivity of the position error to change in marker range. The marker range was simulated at 100, 250, and 500 meters. At 100 meters, the increase in the errors over time is not observable as against when the marker if 500 meters away. The position error for these cases changes from about 15 meters to 37.71 meters. To summarize the results, Table 2 shows the magnitudes of the mean position errors for the different cases simulated above.

TABLE 2

Magnitude of Position Error Results

| | TOI POSITION ERROR | |
|---|---|---|
| | MEAN (M) | STD. DEV (M) |
| No Angular and Attitude Errors Simulated | 13.107 | 10.2885 |
| Constant 1 degree Angular Error on both X- and Y- planes | 15.5905 | 11.3977 |
| Zero-mean Uni-variance Angular Error on both X- and Y- planes | 18.2971 | 14.5312 |
| Gyro Drift of 36 degrees per hour | 18.2509 | 13.4489 |
| Gyro Misalignment of 0.25 degrees and Gyro drift of 36 degrees per hour | 19.1066 | 13.9676 |
| Random Angular Error Gyro Drift of 36 degrees per hour and Gyro Misalignment of 0.25 degrees   100 m, Marker range | 15.0609 | 9.6477 |
| 250 m, Marker range | 18.9142 | 13.4438 |
| 500 m, Marker range | 37.7098 | 29.3339 |

In summary, the evaluation of the TOI algorithm to angular and attitude errors shows that it provides a navigation solution even in the presence of realistic measurement errors. The interesting finding is that both the angular and attitude errors are proportional to the product of the tangent of angular error and marker range. This implies a simplified error analysis for the measurement errors in consideration. The results show a performance level similar to GPS stand alone for most cases except when the marker range is 500 m. This marker range is dependent on field of view of the camera. As a result, in the case where the camera will allow tracking of features that are farther away, the camera calibration, alignment and attitude errors need to be more accurately determined and calibrated out. Also, gyro drift has the most significant impact on the error propagation. Although the mean of the error is fairly tolerable, it does show a diverging trend. This implies that for navigation for longer times with a deteriorated gyro drift would require other methods of correction for the attitude error as it exceeds the performance requirements. On the other hand, even with larger than GPS stand alone errors, the TOI does provide a solution with reasonable performance when GPS is not available. This is consistent with the original motivation for the topic of research, which is to improve the availability of a navigation solution in an environment with a reduced GPS constellation.

The results indicate a potential for the TOI algorithm to provide not only availability, but also accuracy benefits. A performance analysis in terms of integrity and accuracy is necessary to analyze this potential. For an insightful discussion on this the reader is directed to.

Also, since position error results have shown a fair tolerance in realistic error simulations, the next logical step is to conduct a field test with real world data. Such an experiment would require attitude information, a GPS receiver, and a camera at the very least. A preliminary field test with interesting results has been conducted which also involved an algorithm for auto-location of the marker. This provides the benefit of removing the constraint of a priori knowledge of the marker.

In this disclosure, inertial instruments have been assumed to be the primary sources for attitude information. An investigation into alternative sources for deriving these measurements is necessary, e.g. using user velocity vector for obtaining attitude, tracking a marker over multiple epochs to obtain and correct for attitude errors, etc.

The present approach is a single camera single epoch approach. The results indicate that with multiple markers the requirement for the number of visible GPS satellites can be minimized. Such an effort could involve epipolar geometry or a stereo motion approach. Multiple markers can also be used to derive attitude information. This may be used for the TOI solution or be blended with inertial measurements to correct for and limit the drift error from the gyroscopes.

Referring again to FIG. 8, a conventional GPS geometry 800 is illustrated; having four GPS satellite vehicles such as may be used in accordance with one or more embodiments of the present invention. In navigation and/or determining the position of a user in 3D space, the conventional GPS geometry 800 normally assumes a minimum of four GPS satellite vehicles (e.g., 801, 802, 803 and 804), for example, located at respective satellite positions (e.g., $X_{sv,1}$, $X_{sv,2}$, $X_{sv,3}$, and $X_{sv,4}$), to determine a user position $X_u$ 805. Direction cosines or unit vectors (e.g., $e_{sv,1}$, $e_{sv,2}$, $e_{sv,3}$, and $e_{sv,4}$) extending from the user position $X_u$ 805 toward the respective GPS satellite vehicles (e.g., 801, 802, 803 and 804) are also illustrated.

Figure 34:
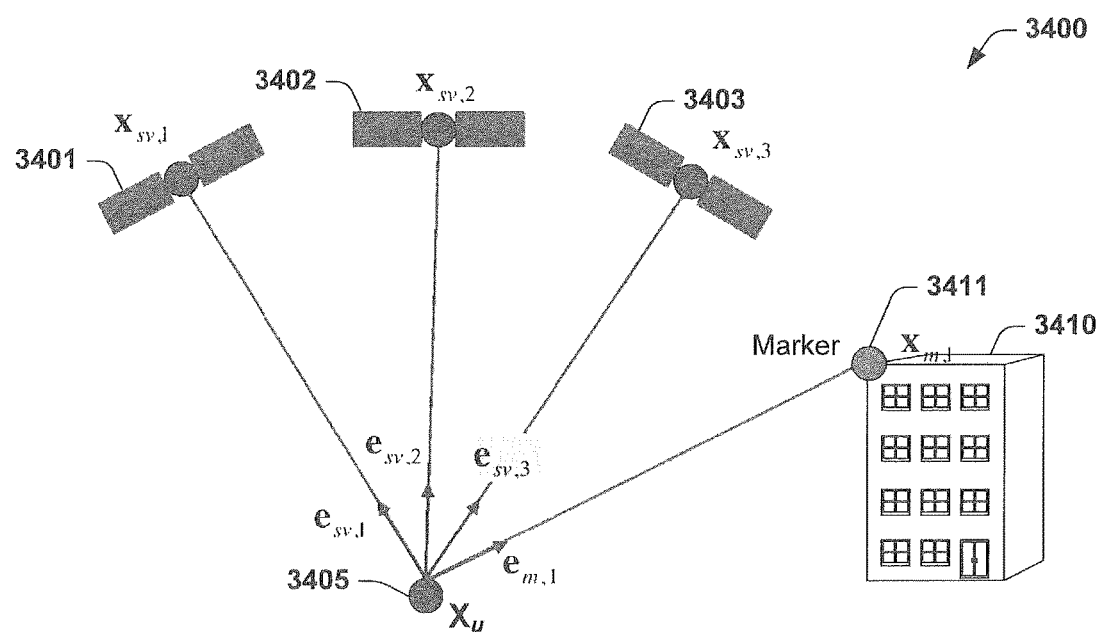
FIG. 34 is a simplified diagram of an exemplary tight optical integration (TOI) geometry comprising three GPS satellite vehicles and one marker, such as may be used in accordance with one or more embodiments.

FIG. 34 illustrates a simplified diagram of an exemplary tight optical integration (TOI) geometry 3400 comprising three GPS satellite vehicles and one marker, such as may be used in accordance with one or more embodiments. The TOI geometry 3400, comprises, for example, three GPS satellite vehicles (e.g., 3401, 3402 and 3402), located at respective satellite positions (e.g., $X_{sv,1}$, $X_{sv,2}$, and $X_{sv,3}$) and a marker $X_{m,1}$ 3411, which may also be used in a TOI algorithm or method (e.g., in a T-matrix or ordinary least squares matrix) to solve for a user position $X_u$ 3405. The marker $X_{m,1}$ 3411 or known marker comprises a predetermined or known position that may include one or more of a terrestrial marker, an astronomical marker (e.g., visible low orbit satellite, star, planet), a vehicular marker, and an airborne marker (e.g., aircraft, airplane, helicopter, marker flare, whether balloon), or any other such object which can be optically viewed from user position $X_u$ 3405.

A goal of the present invention is to provide a method/algorithm (e.g., the TOI algorithm) for determining the position of a user in urban canyon and other such environments having limited GPS signal availability. To accomplish this goal the TOI geometry 3400 along with the TOI algorithm integrates available GPS and optical sensor measurements to accurately calculate the user position. For example, a relatively inexpensive digital camera may be used to provide optical information and inertial information of the camera relative to or associated with the position of the known marker $X_{m,1}$ 3411. The inertial information, for example, may be obtained from a conventional inertial measurement system that provides the "pitch, roll and heading" of the camera body itself (camera frame of reference or camera unit vector) relative to the earth frame of reference. The optical and inertial information can then be readily translated into angular information of a unit vector $e_{m,1}$ extending from the user position $X_u$ 3405 toward the known marker $X_{m,1}$ 3411. Beneficially, such angular information of the unit vector $e_{m,1}$ may then be used to replace one or more GPS satellite vehicle measurements.

It will be appreciated that the angular information of the unit vector $e_{m,1}$ discussed above, comprises both the "pitch, roll and heading" of the camera body itself (camera frame of reference or camera unit vector), as well as a direction cosine or image vector within the camera which extends from a particular pixel or group of pixels associated with the marker, through the focal point and to the known marker $X_{m,1}$ 3411. The sum of these vectors or resultant vector, will be referred to herein, as the unit vector $e_{m,1}$.

Thus, the unit vectors (e.g., $e_{sv,1}$, $e_{sv,2}$, and $e_{sv,3}$) extending from the user position $X_u$ 3405 toward the respective GPS satellite vehicles (e.g., 3401, 3402 and 3402) together with angular information from the unit vector $e_{m,1}$ extending toward the known marker $X_{m,1}$ 3411 can be utilized by the TOI algorithm to solve for the user position $X_u$ 3405 in accordance with one embodiment, without the use of optical range (distance) information.

Figure 35:
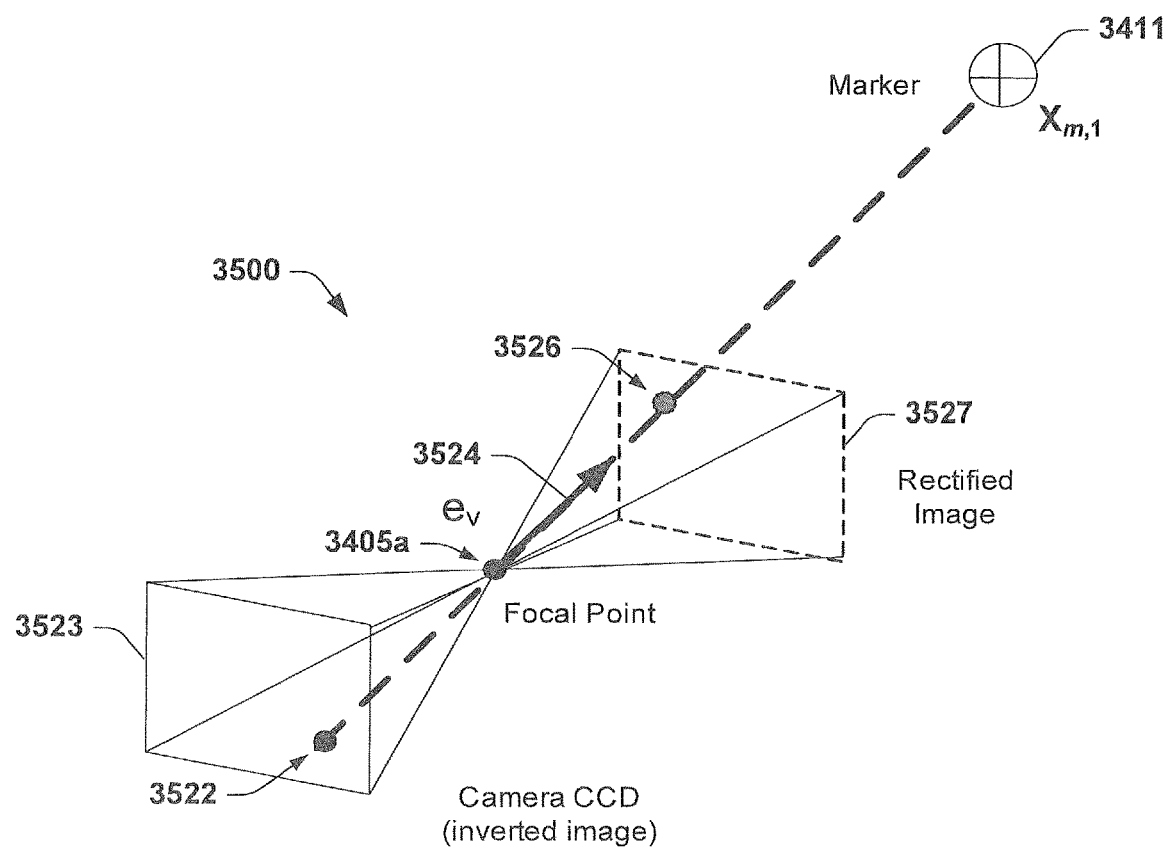
FIG. 35 is diagram of an exemplary camera frame of reference for a direction cosine or unit vector in the camera body extending from a marker pixel, through the focal point and to a marker, such as may be used in accordance with one or more embodiments.

FIG. 35, for example, illustrates a diagram of an exemplary camera frame of reference 3500 for a direction cosine or unit vector $e_v$ 3524 in the camera body extending from a marker pixel 3522, through the focal point 3405a and to the known marker $X_{m,1}$ 3411, such as may be used in accordance with one or more embodiments of the present invention. The camera or digital camera discussed above may include an array of pixels such as in a charge coupled device (CCD) that form an inverted image 3523 on the CCD. When the camera is directed toward the known marker $X_{m,1}$ 3411, an inverted image 3523 is formed on the CCD array, while a rectified image 3527 is similarly formed in front of the camera. Using conventional image recognition software techniques, such as Hough transform shape detectors, corner and edge detectors, stereo vision, the Scale Invariant Feature Transform (SIFT), or Speeded Up Robust Features (SURF), for example, the position of the known marker $X_{m,1}$ 3411 within the camera image 3523 can be mapped to a pixel (or group of pixels) 3522 within the pixel array. This mapping can then provide the angular information of the image vector or unit vector $e_v$ 3524 in the camera body that extends from the marker pixel 3522, through the focal point 3405a to the known marker $X_{m,1}$ 3411.

Figure 36:
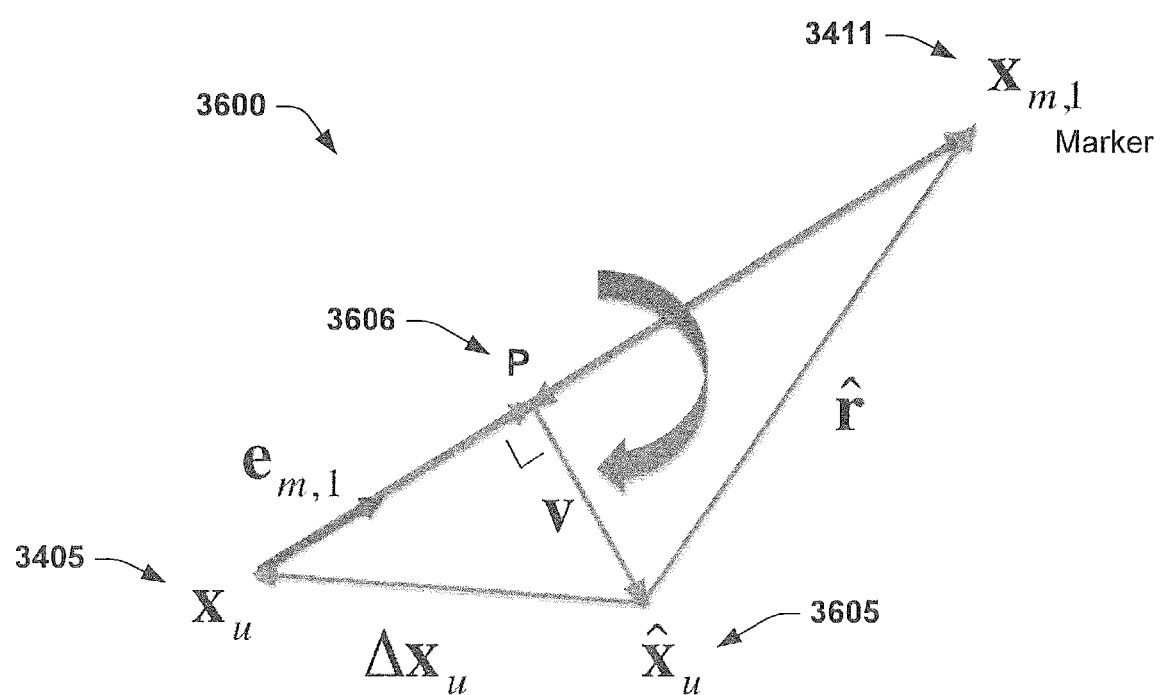
FIG. 36 is a vector diagram of the marker geometry of FIG. 2 in the presence of a position offset with a dummy vector v.

FIG. 36 further illustrates a vector diagram 3600 of the TOI marker geometry 3400 of FIG. 34 in the presence of a position offset $\hat{X}_u$ 3605 with a dummy vector v. Vector diagram 3600 comprises the unit vector $e_{m,1}$ extending from the true user position $X_u$ 3405 toward the known marker position $X_{m,1}$ 3411, differential offset vector $\Delta X_u$ between the true user position $X_u$ 3405 and the user offset position or estimated position $\hat{X}_u$ 3605, a vector $\hat{r}$ between the user offset position $\hat{X}_u$ 3605 and the known marker position $X_{m,1}$ 3411, and the dummy vector v between the user offset position $\hat{X}_u$ 3605 and a camera focal point P 3606 perpendicular to the unit vector $e_{m,1}$.

Referring again to FIG. 12 illustrates a simplified diagram of another exemplary TOI geometry 1200 comprising two GPS satellite vehicles and two markers, such as may be used in accordance with one or more embodiments. The TOI geometry 1200, comprises, for example, two GPS satellite vehicles (e.g., 1201 and 1202), located at respective satellite positions (e.g., $X_{sv,1}$ and $X_{sv,2}$) and two (known) markers $X_{m,1}$ 1211 and $X_{m,2}$ 1212 which may be used in the TOI algorithm (e.g., in a T-matrix or ordinary least squares matrix) to solve for a user position $X_u$ 1205. The (known) markers $X_{m,1}$ 1211 and $X_{m,2}$ 1212, again, comprise a predetermined or known position that may include one or more of a terrestrial marker, an astronomical marker, a vehicular marker, and an airborn marker which can be optically viewed from user position $X_u$ 1205.

In the TOI geometry 1200 of FIG. 12, the optical and inertial information of the camera is readily translated into angular information of unit vectors $e_{m,1}$ and $e_{m,2}$ extending from the user position $X_u$ 1205 toward the respective known markers $X_{m,1}$ 1211 and $X_{m,2}$ 1212. Beneficially, such angular information of the unit vectors $e_{m,1}$ and $e_{m,2}$ may then be used to replace two or more GPS satellite vehicle measurements.

Again, it will be appreciated that the angular information of the unit vectors $e_{m,1}$ and $e_{m,2}$ discussed above, comprise both the "pitch, roll and heading" of the camera body itself (camera frame of reference or camera unit vector), as well as a direction cosine or image vector within the camera which extends from a respective pixel or group of pixels associated with a respective marker, through the focal point and to the known markers $X_{m,1}$ 1211 and $X_{m,2}$ 1212.

Thus, the GPS satellite unit vectors (e.g., $e_{sv,1}$ and $e_{sv,2}$) extending from the user position $X_u$ 1205 toward the respective GPS satellite vehicles (e.g., 1201 and 1202), together with angular information of the unit vectors $e_{m,1}$ and $e_{m,2}$ extending toward the known markers $X_{m,1}$ 1211 and $X_{m,2}$ 1212 can be utilized by the TOI algorithm to solve for the user position $X_u$ 1205 in accordance with another embodiment, without the use of optical range information.

Figure 37:
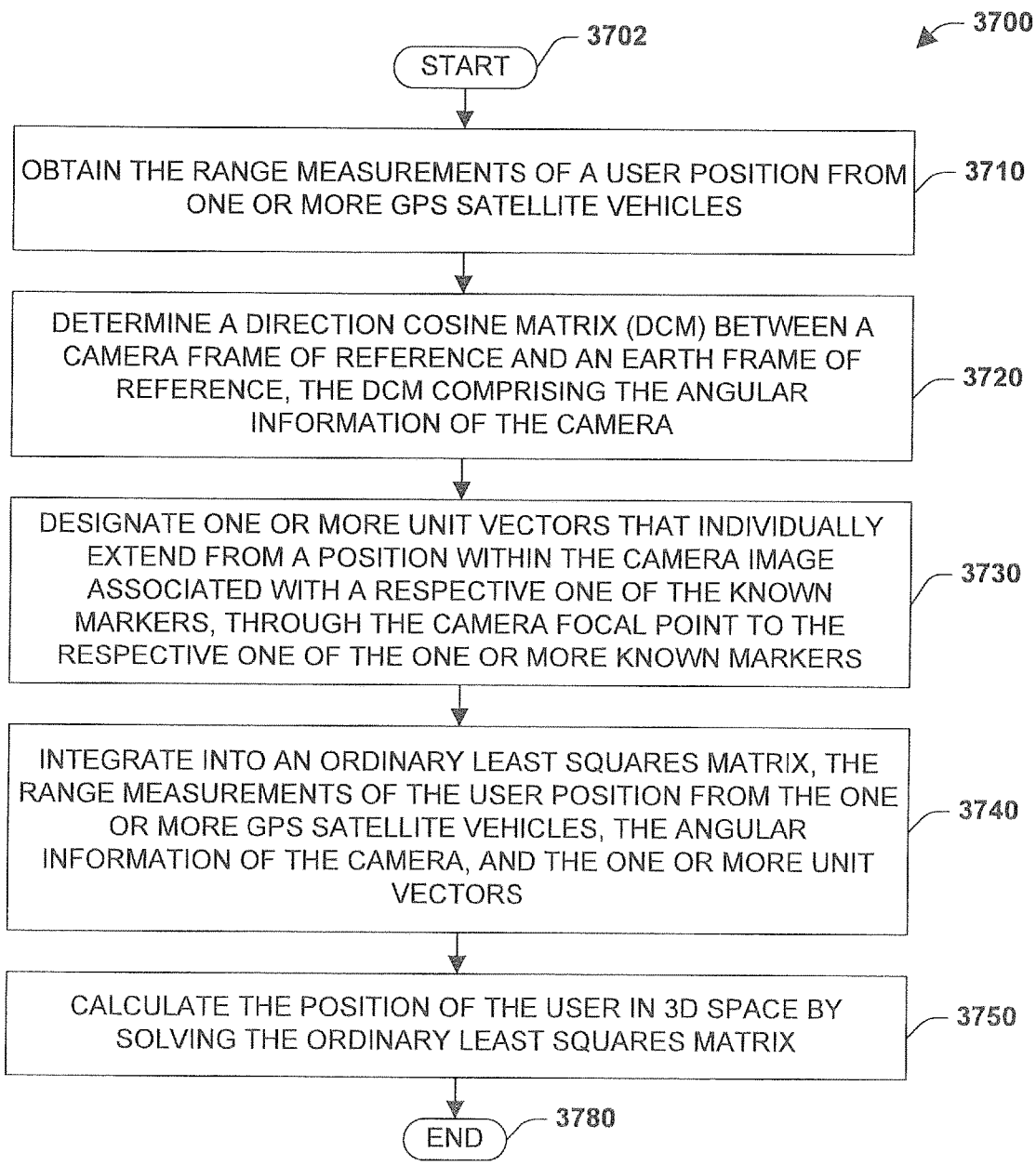
FIG. 37 is a flow diagram illustrating an exemplary methodology for determining the position of a user in 3D space utilizing the TOI algorithm in accordance with one or more embodiments.

In FIG. 37, for example, an exemplary methodology 3700 is illustrated for determining the position of a user in 3D space, such as user position $X_u$ 1205 in the TOI geometry 1200 of FIG. 12, utilizing the TOI algorithm in accordance with one or more embodiments, for example, using two GPS satellites and/or two known markers during navigation or user positioning in an urban canyon situation. As with all methodologies discussed herein, although the methodology 3700 is illustrated and described hereinafter as a series of acts or events, it will be appreciated that the present invention is not limited by the illustrated ordering of such acts or events. For example, some acts may occur in different orders and/or concurrently with other acts or events apart from those illustrated and/or described herein. In addition, not all illustrated steps may be required to implement a methodology in accordance with one or more aspects of the present invention. Further, one or more of the acts may be carried out in one or more separate acts or phases. It will be appreciated that a methodology carried out according to one or more aspects of the present invention may be implemented in association with the formation and/or processing of structures illustrated and described herein as well as in association with other structures not illustrated or described herein.

The methodology 3700, for example, begins at 3702, and thereafter at 3710 the range measurements (e.g., unit vectors $e_{sv,1}$ and $e_{sv,2}$) of a user position (e.g., $X_u$ 1205) from one or more GPS satellite vehicles (e.g., 1201 and 1202) located at respective satellite vehicle positions (e.g., $X_{sv,1}$ and $X_{sv,2}$), are obtained, for example, conventionally.

At 3720, method 3700 comprises determining a direction cosine matrix (DCM) between a camera frame of reference and an earth frame of reference, for example, comprising the angular information of the camera. (See equation (8) in the "Performance Analysis and Integrity Aspects of TOI with GPS" section above).

At 3730, method 3700 comprises designating one or more unit vectors (e.g., $e_{m,1}$ and $e_{m,2}$) that individually extend from a position within the camera image associated with a respective one of the known markers, through the camera focal point (e.g., 3405a of FIG. 35) to a respective one of the one or more known markers (e.g., $X_{m,1}$ 3411 of FIGS. 34 and 35 or $X_{m,1}$ 1211, and $X_{m,2}$ 1212 of FIG. 12), based on the camera measurements. For example, such camera measurements not only individually map a marker pixel (e.g., 3522) to one of a respective known marker (e.g., $X_{m,1}$ 1211 or $X_{m,2}$ 1212), but also include the "pitch, roll and heading" of the camera body itself, for example, using an inertial measurement system configured to provide the angular information of the camera frame of reference (e.g., 3500 of FIG. 35).

At 3740, method 3700 comprises integrating into an ordinary least squares matrix (e.g., equation (8) above), the range measurements (e.g., unit vectors $e_{sv,1}$ and $e_{sv,2}$) of the user position (e.g., $X_u$ 1205) from the one or more GPS satellite vehicles (e.g., 1201 and 1202), the angular information of the camera (inertial measurements of the "pitch, roll and heading"), and the one or more unit vectors (e.g., $e_{m,1}$ and $e_{m,2}$).

Finally, at 3750, method 3700 comprises calculating the position of the user (e.g., $X_u$ 1205) in 3D space, by solving the ordinary least squares matrix (e.g., equation (8) above).

Thereafter, the method ends at 3780.

It will be appreciated that additional calculation iterations of the ordinary least squares matrix can also be subsequently performed to further converge upon a final solution.

Accordingly, the method of the present embodiment utilizes an innovative TOI algorithm that integrates available single epoch GPS range and optical sensor measurements to calculate a user position using one or more GPS satellites and one or more known markers, for example, during navigation or user positioning in an urban canyon situation or any other such situation where GPS signals are blocked by buildings or landmarks. TOI benefits in using these signal blocking landmarks to provide the known marker features that aid the navigation solution and therefore increases availability.

It will be appreciated that while reference is made throughout this document to exemplary navigation geometries and architectures in discussing aspects of one or more TOI algorithms and methodologies described herein (e.g., those navigation geometries presented in FIGS. 8, 34 and 12 while discussing the algorithm/methodology set forth in FIG. 37, that such methodologies are not to be limited by the corresponding geometries presented. Rather, the methodologies (and geometries) are to be considered independent of one another and able to stand alone and be practiced without regard to any of the particular aspects depicted in the figures.

Although tight optical integration has been discussed and illustrated throughout this document with reference to visible light and visible markers, it will be appreciated that any other such wavelength(s) of the electromagnetic spectrum and markers detectable by the respective wavelength, may also be chosen which may be outside the spectrum visible to humans, and as such are also contemplated within the scope of the present invention. For example, all wavelengths of infrared or UV light, as well as LIDAR, LADAR (Laser Detection and Ranging) and RADAR may also be utilized in accordance with the present invention to provide the imaging and angular information. Accordingly, the camera located at the user position, therefore, may comprise an imaging device configured to provide imaging and angular information using one or more or a combination of visible, infrared or UV light, as well as LIDAR, LADAR, or RADAR based systems on known markers, for example. Again, the markers for such imaging systems may utilize one or more of a terrestrial marker, an astronomical marker, a vehicular marker, and an airborne marker, suitable for imaging and angular information detection by one or more of the corresponding wavelengths.

Although one or more aspects of the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature or aspect of the invention may have been disclosed with respect to only one of several implementations, such feature or aspect may be combined with one or more other features or aspects of the other implementations as may be desired and/or advantageous for any given or particular application. Further, the term "exemplary" as used herein merely meant to mean an example, rather than the best. Furthermore, to the extent that the terms "includes", "having", "has", "with", or variants thereof are used in either the detailed description or the claims, such terms are intended to be inclusive in a manner similar to the term "comprising."

What is claimed is:

1. A method of determining a position of a user in 3D space utilizing an integrated navigation system including a GPS receiver and a camera located at the user position when a limited number of GPS signals are available, the method comprising:
   capturing, by the camera, a camera image of a known marker through a focal point of the camera with optical measurements that extend from a position of the known marker within the camera image to the user position of the camera;
   determining two or more pseudoranges between a true user position and two or more GPS satellites with the integrated navigation system, wherein the two or more GPS satellites are insufficient to generate GPS measurements necessary to calculate a GPS standalone position;
   determining a marker unit vector from the optical measurements captured by at least one optic sensor associated with the camera that extends from the position within the camera image associated with the known marker through the focal point of the camera with the integrated navigation system, wherein unavailable GPS measurements necessary to calculate the GPS standalone position are replaced by the marker unit vector;
   converting, by the GPS receiver, the marker unit vector from a camera frame of reference to an earth frame of reference of GPS measurements by incorporating attitude information of the camera obtained from inertial measurements of the camera at the user position to transform a direction cosine of the marker unit vector in the camera frame of reference to the earth frame of reference;
   integrating, by the GPS receiver, the two or more pseudoranges and the marker unit vector into an ordinary least squares matrix with the integrated navigation system;
   generating a shortest vector starting from an estimated user position to a point on the marker unit vector, wherein the shortest vector is perpendicular to the marker unit vector at the point on the marker unit vector;
   converging, by the GPS receiver, a line joining the estimated user position and the marker and the two or more pseudoranges derived from the estimated user position to the point on the marker unit vector generated from the shortest vector being perpendicular to the marker unit vector;
   determining the position of the user in 3D space from the convergence of the line joining the estimated user position and the two or more pseudoranges derived from the estimated user position to the point on the marker unit vector generated from the shortest vector being perpendicular to the marker unit vector by solving the ordinary least squares matrix with the integrated navigation system so that the two or more pseudoranges are supplemented with the marker unit vector to overcome the unavailable GPS measurements to calculate the GPS standalone position.

2. The method of claim 1, wherein the known marker comprises one or more of a terrestrial marker, an astronomical marker, a vehicular marker, and an airborne marker.

3. The method of claim 1, wherein the marker is one of one or more known markers each having known geographical coordinates.

4. The method of claim 1, wherein the pseudoranges of the true user position from the two or more GPS satellites are determined based on a time of arrival of a signal from each of the two or more GPS satellites.

5. The method of claim 1, wherein the camera located at the user position is configured to provide imaging and angular information utilizing one or more of visible light, infrared light, UV light, or using LIDAR, LADAR, or RADAR based systems.

6. The method of claim 1 further comprising:
   determining a direction cosine matrix (DCM) between a camera frame of reference and an earth frame of reference; and
   transforming the marker unit vector from the camera frame of reference to the earth frame of reference using the DCM.

7. The method of claim 6, further comprising:
   directing the camera from the true user position toward the known marker before determining the DCM.

8. The method of claim 1 wherein integrating the two or more pseudoranges and the marker unit vector into the ordinary least squares matrix comprises:
   determining a convergence vector based on the marker unit vector, a position of the known marker, and an estimated user position;
   defining a GPS-visual measurement vector comprising the two or more pseudoranges and the convergence vector; and
   integrating the GPS-visual measurement vector into the ordinary least squares matrix.

9. The method of claim 1 further comprising:
   determining a set of satellite unit vectors comprising two or more satellite unit vectors between an estimated user position and the two or more GPS satellites;
   defining a direction cosine matrix comprising the set of satellite unit vectors and the marker unit vector;
   defining a geometry matrix comprising the direction cosine matrix and a camera weighting factor; and
   integrating the geometry matrix into the ordinary least squares matrix.

10. The method of claim 1 wherein the user position is a second estimated user position, and determining the position of the user in 3D space by solving the ordinary least squares matrix comprises:
   determining an offset between a first estimated user position and the second estimated user position by solving the ordinary least squares matrix; and
   adding the offset to the first estimated user position.

11. The method of claim 1 wherein determining the marker unit vector comprises:
mapping individual pixels in the camera into respective unit vectors individually extending from a respective camera pixel to the camera focal point, thereby generating a pixel map; and
designating a pixel in the pixel map and a respective unit vector that extends from the designated pixel through the camera focal point toward the known marker as the marker unit vector.

12. The method of claim 1 wherein a position of the known marker is determined by self-surveying the known marker while sufficient GPS satellites are available for the integrated navigation system to determine the position of the known marker.

13. The method of claim 1, wherein the converging comprises:

$$v=[I+e_v e_v^T](x_v-\hat{x}), \text{ where}$$

v=the shortest vector,
I=a 3×3 identity matrix,
$e_v$=a unit vector pointing from the camera to the known marker,
$e_v^T$=unit vector pointing from the camera to the known marker relative to a GPS-visual T matrix,
$x_v$=position of the known marker, and
$\hat{x}$=current estimate of the user position.

14. A navigation system comprising:
a camera that includes at least one optic sensor; and
a GPS receiver operatively coupled to the camera, the navigation system when a limited number of GPS signals are available is configured to:
determine two or more pseudoranges between a true user position and two or more GPS satellites, wherein the two or more GPS satellites are insufficient to generate GPS measurements necessary to calculate a GPS standalone position;
determine a marker unit vector from optical measurements captured by the at least one optic sensor included in the camera that extends from a position within a camera image associated with a known marker through a focal point of the camera, wherein unavailable GPS measurements necessary to calculate the GPS standalone position are replaced by the marker unit vector;
convert the marker unit vector from a camera frame of reference to an earth frame of reference of GPS measurements by incorporating attitude information of the camera obtained from inertial measurements of the camera at the user position to transform a direction cosine of the marker unit vector in the camera frame of reference to the earth frame of reference;
integrate the two or more pseudoranges and the marker unit vector into an ordinary least squares matrix;
generate a shortest vector starting from an estimated user position to a point on the marker unit vector, wherein the shortest vector is perpendicular to the marker unit vector at the point on the marker unit vector; and
converge a line joining the estimated user position and the marker and the two or more pseudoranges derived from the estimated user position to the point on the market unit vector generated from the shortest vector being perpendicular to the marker unit vector; and
determine the position of the user in 3D space from the convergence of the line joining the estimated user position and the marker and the two or more pseudoranges derived from the estimated user position to the point on the marker unit vector generated from the shortest vector being perpendicular to the marker unit vector by solving the ordinary least squares matrix so that the two or more pseudoranges are supplemented with the marker unit vector to overcome the unavailable GPS measurements to calculate the GPS standalone position.

15. The system of claim 14 wherein the camera is configured to provide imaging and angular information utilizing one or more of visible light, infrared light, UV light, or using LIDAR, LADAR, or RADAR based systems.

16. The system of claim 14 wherein the system is further configured to:
determine a direction cosine matrix (DCM) between a camera frame of reference and an earth frame of reference; and
transform the marker unit vector from the camera frame of reference to the earth frame of reference using the DCM.

17. The system of claim 14 wherein the system is further configured to:
direct the camera from the true user position toward the known marker before determining the DCM.

18. The system of claim 14 wherein the system is further configured to:
determine a set of satellite unit vectors comprising two or more satellite unit vectors between an estimated user position and the two or more GPS satellites;
define a direction cosine matrix comprising the set of satellite unit vectors and the marker unit vector;
define a geometry matrix comprising the direction cosine matrix and a camera weighting factor; and
integrate the geometry matrix into the ordinary least squares matrix.

19. The system of claim 14 wherein the user position is a second estimated user position, and the system determines the position of the user in 3D space by:
determining an offset between a first estimated user position and the second estimated user position by solving the ordinary least squares matrix; and
adding the offset to the first estimated user position.

20. The system of claim 14 wherein the system determines the marker unit vector by:
mapping individual pixels in the camera into respective unit vectors individually extending from a respective camera pixel to the camera focal point, thereby generating a pixel map; and
designating a pixel in the pixel map and respective unit vector that extends from the respective marker pixel through the camera focal point and toward the known marker as the marker unit vector.

21. The system of claim 14 wherein the system is further configured to:
determine a position of the known marker by self-surveying the known marker while sufficient GPS satellites are available to determine the position of the known marker.

22. The system of claim 14, wherein the GPS receiver is further configured to converge based on:

$$v=[I+e_v e_v^T](x_v-\hat{x}), \text{ where}$$

v=the shortest vector,
I=a 3×3 identity matrix, $e_v$=a unit vector pointing from the camera to the known marker,
$e_v^T$=unit vector pointing from the camera to the known marker relative to a GPS-visual T matrix,
$x_v$=position of the known marker, and
$\hat{x}$=current estimate of the user position.

* * * * *